US012652599B2

(12) United States Patent
Chopade et al.

(10) Patent No.:  US 12,652,599 B2
(45) Date of Patent:       Jun. 9, 2026

(54) METHODS AND APPARATUS FOR USING MACHINE LEARNING TO FACILITATE NETWORK HANDOFFS BETWEEN ACCESS POINTS

(71) Applicant: Charter Communications Operating, LLC, St. Louis, MO (US)

(72) Inventors: Vishal Chopade, Castle Pines, CO (US); Mohamed Daoud, Aurora, CO (US); Hany Heikal, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 279 days.

(21) Appl. No.: 18/527,107

(22) Filed: Dec. 1, 2023

(65) Prior Publication Data

US 2025/0184852 A1      Jun. 5, 2025

(51) Int. Cl.
*H04W 36/32*          (2009.01)
*H04W 36/00*          (2009.01)
*H04W 36/30*          (2009.01)

(52) U.S. Cl.
CPC ..... *H04W 36/322* (2023.05); *H04W 36/0058* (2018.08); *H04W 36/302* (2023.05); *H04W 36/328* (2023.05)

(58) Field of Classification Search
CPC ........... H04W 36/322; H04W 36/0058; H04W 36/302; H04W 36/328; H04W 36/324; H04W 36/36; H04W 36/008375; H04W 84/12
See application file for complete search history.

(56) References Cited

U.S. PATENT DOCUMENTS

| | | | | |
|---|---|---|---|---|
| 9,642,047 | B2 * | 5/2017 | Kim ................... | H04W 36/0058 |
| 10,271,218 | B2 * | 4/2019 | Wang ................... | H04W 16/18 |
| 11,445,432 | B2 | 9/2022 | Ghessassi | |
| 2009/0233602 | A1 * | 9/2009 | Hughes ................ | H04W 36/00 455/436 |
| 2018/0295548 | A1 * | 10/2018 | Kumar ......... | H04W 36/008375 |

(Continued)

FOREIGN PATENT DOCUMENTS

| | | | | | |
|---|---|---|---|---|---|
| CN | 121031979 | A | * | 11/2025 | |
| GB | 2550215 | A | * | 11/2017 | ........... H04B 17/382 |
| JP | 4885965 | B2 | * | 2/2012 | ........ H04W 36/0055 |

*Primary Examiner* — Julio R Perez

(74) *Attorney, Agent, or Firm* — Straub & Straub; Michael P. Straub; Stephen T. Straub

(57)                    ABSTRACT

Data is collected at access points about mobile communications systems, e.g., vehicles, use of access points and the quality of the connections that are provided. The collected information is provided to a machine learning access point (MLAP) model training device that generates one or more MLAP prediction models with each model corresponding to a geographic area in which access points are located. Vehicles provide location, acceleration and/or other information, such as a user entered destination. A vehicle request for an AP recommendation includes this information which allows the AP prediction engine to predict a path of travel. The MLAP prediction engine uses the stored models and/or information about AP loading, to predict what AP a vehicle requesting an AP recommendation should attach to next. The predicted AP is returned as a handoff recommendation along with the location and/or time the vehicle should initiate the handoff to the recommended AP.

20 Claims, 15 Drawing Sheets

(56)        References Cited

U.S. PATENT DOCUMENTS

Figure 1:
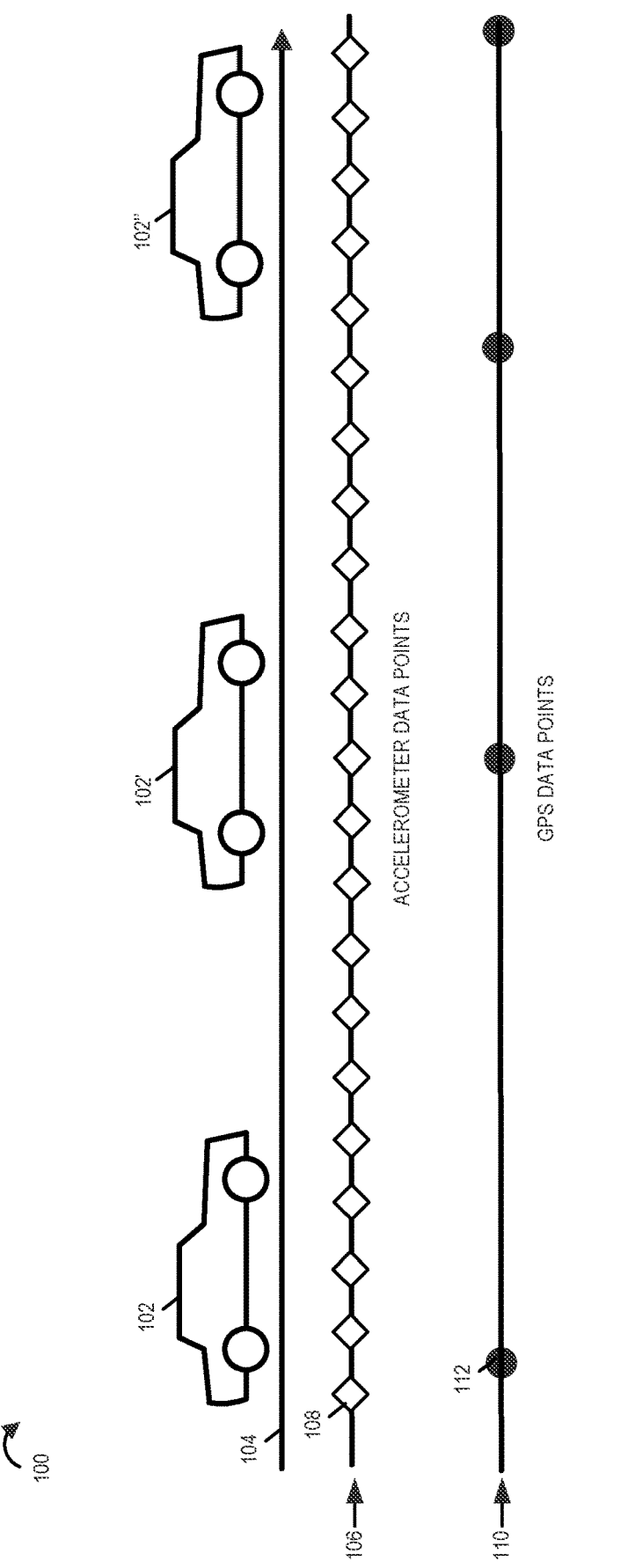

2022/0110026 A1*    4/2022    Tsai  .................. H04W 36/0058
2022/0155996 A1*    5/2022    Moore  .................. G06F 3/0619
2023/0108341 A1*    4/2023    Erta  .................. H04W 28/0268
                                                         370/328
2024/0147318 A1*    5/2024    Khandavalli  ..... H04W 36/0069
2025/0184852 A1*    6/2025    Chopade  ............ H04W 36/302

* cited by examiner

500

EXEMPLARY JSON from AP (ROUTER) to MLAP MODEL TRAINING DEVICE:

```
{
  "data": [
    {
      "time": "2023-09-05T12:30:00",
      "car_MAC_addr": "AB:CD:EF:12:34:56",
      "precise_location": {
        "lat": 37.7749,
        "long": -122.4194
      },
      "speed": 60.5,
      "accelerometer_data": {
        "timestamp": "2023-09-05T12:30:01",
        "x": 0.2,
        "y": -0.1,
        "z": 1.5
      },
      "AP_RSSI": {
        "AP1": -70,
        "AP2": -75,
        "AP3": -80
      },
      "GPS_data": {
        "timestamp": "2023-09-05T12:30:05",
        "lat": 37.7749,
        "long": -122.4194
      }
    }
```

502 →
504 →
506 →
508 →
510 →
512 →
514 →

600

JSON SAMPLE FROM MLAP
PREDICTION ENGINE (PE) TO AP OR
AP PROCESSOR:

```
{
602→     "time": "2023-05-19T10:30:00",
604→     "car_MAC_addr": "AA:BB:CC:DD:EE:FF",
606→     "precise_location": {
            "latitude": 37.7749,
            "longitude": -122.4194
         },
608→     "speed": 60,
610→     "predicted_future_location": {
            "latitude": 37.7755,
            "longitude": -122.4185
         },
612→     "AP_to_connect": "AP1",
614→     "Authentication": "WPA2-PSK",
616→     "Prediction": {
            "pred_AP_location": {
               "latitude": 37.7758,
               "longitude": -122.4183
            },
616→        "pred_time_until_connection": 120,
618→        "pred_AP_location": "AP2"
         }
}
```

620
┌ ─ ─ ─ ─ ─ ─ ─ ─ ─ ─ ─ ─ ─ ─ ┐
│     ADDITIONAL HANDOFF INFORMATION     │
│  RELATING TO PREDICTED HANDOFF FROM  │
│                  AP2 TO AP3                  │
└ ─ ─ ─ ─ ─ ─ ─ ─ ─ ─ ─ ─ ─ ─ ┘

FIGURE 6

| |
|---|
| FIGURE 7A |
| FIGURE 7B |
| FIGURE 7C |

FIGURE 7

METHODS AND APPARATUS FOR USING MACHINE LEARNING TO FACILITATE NETWORK HANDOFFS BETWEEN ACCESS POINTS

FIELD

The present application relates to communications methods and, more particularly to methods and apparatus for using machine learning and predictive models to facilitate network handoffs of mobile communications systems, e.g., vehicles which support WiFi, between access points, e.g., WiFi access points.

BACKGROUND

In the realm of wireless connectivity, maintaining a stable and uninterrupted connection between devices is important for smooth communication and seamless data transfer. While Wi-Fi technology has revolutionized the way we connect and share information, it is not immune to certain limitations that can result in what is commonly known as a "dead zone". This occurs when the connection between devices remains technically active, yet the transmission of packets becomes unfeasible. The repercussions of this phenomenon are particularly pronounced when encountered in scenarios involving moving vehicles attempting to connect to Wi-Fi networks, where slow handoff and the absence of network spots exacerbate the problem. It is useful to consider the mechanics of Wi-Fi connectivity and the challenges it presents in maintaining consistent and reliable connections, especially in mobile environments.

In many cases where WiFi is used a moving device will remain connected to a serving WiFi AP until, because of a weak signal or signal interference the moving device, e.g., vehicle, can no longer connect through the serving AP that was being used. At such a point the moving device will, in at least some cases, search for another AP and select the AP with the highest signal strength assuming that multiple APs are detected.

Upon connecting to the new AP, which had no reason to expect the connection from the moving device, the new AP will seek to ascertain what services the UE is entitled to and/or other information. This can take time as the AP will, in many cases, need to obtain such information from another device with access to all or at least some of the information used in determining what services are to be provided and/or entitlement to such services.

The AP to which the moving device connected already had sufficient information to determine what services the moving device was entitled to and/or information needed to provide such services. Unfortunately, when the mobile device connects unexpectedly the new AP normally does not have information about the previously serving AP and/or information specific to the connecting mobile device which was available at the AP previously serving the moving device. Thus, the new AP must seek such information without the assistance of the previously serving AP. This can lead to delays in completing a handoff that could be implemented more easily or faster if the previously serving AP was able to provide information about the moving device to the new AP. While delays with regard to obtaining information used in providing service to a moving device is one issue, another issue is simply that the moving device in such an example waits until it detects that it can no longer communicate with an AP before trying to connect to another AP. The detection of loss of communication can take some time, and in some cases a better connection might have been available prior to the loss of communication.

In view of the above, it should be appreciated that it would be desirable if methods and/or apparatus could be developed which could facilitate rapid handovers or connections of mobile devices such as vehicles to new APs by increasing the chance that the new AP will be provided with, or be able to obtain information from the previously serving AP. In addition, it would be useful if in at least some embodiments a moving device did not wait until loss of a connection with an AP to consider making a connection to a new AP.

SUMMARY

Methods and apparatus for improving communications reliability of mobile communications systems, e.g., vehicles with wireless communications devices, e.g., WiFi communications interfaces or devices, are described. While the methods can be used by and implemented by various vehicles, for purposes of explaining the invention the vehicle will be explained using the example of a mobile vehicle such as a car or truck. Thus, future reference to discussions of a vehicle should be interpreted as equally applicable to a wide range of mobile communications systems.

In an exemplary embodiment in which the mobile communications system is a vehicle, the wireless communications device may be integrated directly into the vehicle or may be located in the vehicle and connected by wires or wirelessly to various other components, e.g., the onboard navigation system, in the vehicle to form the mobile communications system. In the case where the mobile communications system is a vehicle, it should be appreciated that the vehicle may travel over large distances and pass out of the range of one access point (AP) and into the range of another AP on multiple occasions during the devices travel. The travel may be along a driver determined path or a path determined by a user entering a destination into a vehicle navigation system which may then control vehicle speed and direction and/or guide the driver of the vehicle along a path to the destination.

The exemplary vehicle may be, e.g., a car or other vehicle which supports WiFi, or another wireless communications standard for communications purposes, e.g., network connectivity.

In various embodiments, the location of access points and related information is stored and made available to a machine learning access point (MLAP) model training device that generates MLAP prediction models which are used to predict what AP, or sequence of APs, a vehicle should attach to at one or more points as the vehicle travels along a path. The MLAP prediction models are stored in or loaded into an AP prediction engine which uses machine learning models. The MLAP prediction engine then uses the MLAP prediction models to make AP recommendations to vehicles. Different MLAP prediction models may be, and sometimes are, used for different geographic regions but a single MLAP prediction model in some embodiments can be used for a large area and/or all MLAP predictions.

Subscriber information which indicates what services an individual UE is entitled to may also be stored in the network core.

During an initial period of time APs collect initial model training data that is then used for training and/or validating the MLAP models. The collected data includes information provided by clients of the APs collecting the data. The clients can and often do include vehicles using the APs. The data collected by the APs, which in many cases are routers or devices acting as routers, includes data on individual devices arrival at the AP and departure from the AP, and RSSI information reported by the corresponding individual devices. The collected information can also include data utilization by individual devices, AP loading information and/or latency associated with individual devices. Thus, the collected information can include information corresponding to multiple vehicles which used an AP and the quality and/or amount of service the vehicles were provided for one or more services, e.g., data services, e.g., at different times.

The information collected by an AP, some of which is provided by client devices which may be vehicles which connect to the AP for service, is provided to the MLAP model training device, e.g., in the network core. The MLAP model training device will receive such information from multiple APs at different locations and generate one or more MLAP prediction models from the collected information.

The MLAP prediction models are then provided to one or more MLAP prediction engines. The MLAP prediction engines may be located in a network core and/or incorporated into one or more APs.

Vehicles seek assistance in determining what AP to attach to and/or where or when a change in AP connections should be implemented, seek an AP recommendation from an MLAP engine prior to losing a connection to the AP to which it is connected. A vehicle may send a message seeking assistance in determining what AP to attach to in response to detecting one or more triggers for sending such a message. The AP prediction request includes, in some embodiments, a vehicle identifier, e.g., MAC address of the car sending the request, mobile communication system location information, speed, accelerometer data, RSSI information for one or more APs detected by the requesting mobile communication system, GPS data and time stamp information corresponding to the GPS data. Direction of travel information can and sometimes is included with the request as well.

In some embodiments sending an AP recommendation request message is triggered by the vehicle measuring or determining an RSSI value, corresponding to the AP to which it is connected, dropping below a threshold value. Another trigger for sending an AP recommendation request message can be, and sometimes is, entry of a destination into a vehicle navigation system and/or the vehicle navigation system determining a new vehicle route, e.g., because of a missed turn or other change in the expected route.

The sending of an AP recommendation request message, by a mobile communication system, results in the message being communicated, by the AP receiving the message, to an MLAP prediction engine implemented in a core network node when the MLAP prediction engine is implemented as a cloud based system. The MLAP engine receiving the AP recommendation request will generate a response including a recommendation of one or more APs to use at a future point in time and/or starting at a particular location along the path of the vehicle. In the case where the MLAP prediction engine is implemented at the AP receiving the message, the MLAP prediction engine in the AP will be used to generate the response. MLAP predictions can be based solely on the provided information and the MLAP prediction models used by the MLAP prediction engine but in some embodiments can also be based on current known loading information reported by one or more APs to the network core and/or nodes including the MLAP prediction engines.

The MLAP prediction engine which receives an AP prediction request, predicts at least one AP along the mobile communication system's path that should be used by the vehicle from which the AP prediction request was received. In cases where a path to a destination is determined based on destination information input to a vehicle navigation system the MLAP prediction engine may determine and list a series of APs which are recommended based on the indicated navigation path to be taken by the vehicle.

The MLAP prediction engine responds to the AP prediction request by sending information, e.g., in a message, to AP providing service to the vehicle which sent the request. The AP prediction message indicates the location at which the vehicle to which the message relates is to switch, e.g., handoff, to another AP, the expected time until the vehicle will reach the handoff location and thus initiate the handoff and the AP recommended by the MLAP prediction engine to which the handoff should be made. In the case where subsequent handoffs are also recommended, the expected time to such additional handoffs is also indicated along with the location at which handoffs should be made and the AP to which each handoff is to be made.

The AP receiving the AP prediction message communicates the prediction message to the UE and also stores the information for use in facilitating a handoff the predicted AP. The prediction message and vehicle related information is communicated by the serving AP to the predicted AP prior to the predicated handoff time allowing the predicated AP to prepare for the handoff. The communicated information sent from the serving AP to the predicted AP can include context and/or other service information, e.g., service entitlement information indicating service to which the vehicle involved in the handoff is entitled to receive. Such information can reduce the amount of time needed by the predicted AP to determine entitlement to services and/or initiate providing of services.

Subsequent to the initial model training, e.g., during one or more periods of time in which vehicles use AP predictions to determine when to implement AP handoffs and where the handoffs are to occur, the APs collect the same type of model training data collected during the initial time period in which data is collected for model training purposes. The collected data is communicated from the APs to the MLAP model training device which then uses the information to train new MLAP models which may be completely new models or updated versions of the previously generated models. The newly generated MLAP models are then communicated to the MLAP engines and used to generate AP predictions for vehicles in response to AP prediction requests.

By providing AP recommendations and supplying vehicle information to recommended APs prior to the vehicle trying to connect to the AP the time required for the vehicle to connect and obtain communication services via a recommended AP can be reduced as compared to systems which do not use AP recommendations and/or handoff predictions as part of a handoff process. In addition, the risk that the vehicle will lose connectivity is reduced as compared to systems where the vehicle remains attached to an AP until it loses the ability to communicate with the AP since the vehicle will proactively switch to a recommended AP prior to losing network connectivity. By obtaining AP recommendations rather than simply selecting an AP based on received signal strength, the mobile communications system, e.g., vehicle, is likely to obtain better service than when selecting APs based on signal strength since the AP recommendation is based on information about the previously detected success of vehicles using the recommended AP in the past as well as potentially current information known to the AP recommendation engine regarding AP loading which may not be known to the vehicle.

By utilizing the power of the cloud, real-time analysis of vehicle data enables proactive adjustments to Wi-Fi connections as UEs move through different areas. Additionally, edge computing plays a role by enabling APs to exchange signal strength information with nearby APs including AP machine learning prediction engines and/or cloud or core based AP prediction engines which can determine efficient connections for devices in the network using machine learning prediction models. These methods can improve Wi-Fi network management as compared to system which does not take advantage of such information and the advantage of ML trained prediction models, leading to intelligent and adaptive connectivity, improved performance, decreased dead zones, and/or optimized network resource utilization. This can enhance Wi-Fi user experiences for users in mobile environments, ensuring seamless data transmission and a more immersive digital journey as a user travels in a vehicle which takes advantage of the AP recommendation capabilities of the enabled by the methods described herein.

Numerous additional features, benefits and exemplary embodiments are discussed in the detailed description which follows.

BRIEF DESCRIPTION OF THE FIGURES

FIG. 1 is a drawing illustrating an exemplary mobile communications system, e.g., a vehicle including a wireless communications device, e.g., a WiFi UE which includes accelerometers and a GPS receiver and which uses accelerometer data in conjunction with GPS data to determine its location, direction of travel, and speed, and communicates collected data to an AP, to a machine learning AP (MLAP) model training device and/or to a MLAP prediction engine, in accordance with an exemplary embodiment.

FIG. 2 illustrates exemplary access points (APs), exemplary mobile communications systems, e.g., vehicles including exemplary communication devices, e.g., WiFi UEs, and illustrates that the WiFi connection strength between a particular AP and a particular mobile communications system, e.g., vehicle, changes as the exemplary mobile communications system moves throughout the system, e.g., sometimes requiring a handoff to another AP.

FIG. 3 illustrates an exemplary method for collecting data, processing data, training machine learning AP attachment prediction models for facilitating efficient automatic network handoff, evaluating and tuning the models and deploying the models in accordance with an exemplary embodiment.

FIG. 4 illustrates an exemplary communications system including a machine learning access point (MLAP) model training device, a machine learning access point (MLAP) prediction engine, exemplary APs, and an exemplary mobile communications system, e.g., a vehicle including a wireless communications device, and further illustrating an example in which an automatic network handoff is performed using MLAP prediction information generated in response to an AP recommendation request in accordance with an exemplary embodiment.

FIG. 5 is a drawing of an exemplary JSON illustrating exemplary message formats and including exemplary data, e.g., originally sourced from a mobile communications system, e.g., a vehicle including a WiFi UE, to be communicated from an AP (router) to a MLAP model training device in accordance with an exemplary embodiment.

FIG. 6 is a drawing of an exemplary JSON illustrating exemplary message formats and including exemplary data to be communicated from a MLAP prediction engine to an AP in accordance with an exemplary embodiment.

FIG. 7A is a first part of a flowchart which illustrates an exemplary method of supporting and implementing handoffs of mobile communications systems, e.g., vehicles which include a wireless communications device or wireless interface, as the vehicles move through an environment, e.g., along a road or other travel path, in accordance with an exemplary embodiment.

FIG. 7B is a second part of a flowchart which illustrates an exemplary method of supporting and implementing handoffs of mobile communications systems, e.g., vehicles which include a wireless communications device or wireless interface, as the vehicles move through an environment, e.g., along a road or other travel path, in accordance with an exemplary embodiment.

FIG. 7C is a third part of a flowchart which illustrates an exemplary method of supporting and implementing handoffs of mobile communications systems, e.g., vehicles which include a wireless communications device or wireless interface, as the vehicles move through an environment, e.g., along a road or other travel path, in accordance with an exemplary embodiment.

FIG. 7 comprises the combination of FIG. 7A, FIG. 7B and FIG. 7C.

FIG. 8 is a drawing of an exemplary mobile communications system, e.g., a vehicle including a wireless communications device, e.g., a WiFi UE, in accordance with an exemplary embodiment.

FIG. 9 is drawing of an exemplary access point (AP), e.g., a WiFi AP, in accordance with an exemplary embodiment.

FIG. 10 is a drawing of an exemplary machine learning access point (MLAP) model training device in accordance with an exemplary embodiment.

FIG. 11 is a drawing of an exemplary MLAP prediction engine (PE) in accordance with an exemplary embodiment.

FIG. 12 is a drawing of an exemplary AP recommendation request message to be sent from a mobile communications system, e.g., a vehicle, to an AP to be communicated to a MLAP prediction engine, in accordance with an exemplary embodiment.

DETAILED DESCRIPTION

An access point, e.g., a WiFi AP, sometimes referred to as a router, gathers relevant information from a vehicle, such as its speed and accelerometer data. This collected data is then utilized by a machine learning model, which has been trained to analyze and interpret the inputs. By leveraging the power of machine learning algorithms, the model processes the data and generates valuable insights or predictions based on its training. In this context, the ML model uses the vehicle's speed and accelerometer data as input to make informed decisions regarding Wi-Fi handoffs and optimize network connectivity. This intelligent analysis enables the access point (router) to adapt and respond dynamically to the vehicle's movement, ensuring smoother transitions between network spots and reducing the occurrence of dead zones.

Location calibration in a car using accelerometers will now be described.

Accelerometers are sensors that measure the acceleration of an object in a specific direction. In cars, accelerometers are used to measure the rate of change of the car's velocity in different directions. When used in combination with GPS (Global Positioning System), accelerometers can help the car get a more precise location on a map.

FIG. 1 is a drawing 100 illustrating an exemplary mobile communications system 102, e.g., a vehicle including a wireless communications device, e.g., a WiFi UE which is travelling, e.g., along a road, as indicated by arrow 104. Exemplary mobile communications system 102 includes accelerometers, gyroscopes and a GPS receiver. The same exemplary mobile communications system 102 is shown at three different locations at three different points in time as it travels and is represented as mobile communications device (102, 102', 102"), at the (first, second, and third) locations, respectively. The exemplary mobile communications device 102 is constantly receiving accelerometer data, which is output from its accelerometers (e.g., a triad of accelerometers (X, Y, Z orthogonal accelerometers)), as indicated sequence of accelerometer data points 106, with individual accelerometer data points being represented by diamonds 108. Typically, the mobile communications device 102 is also receiving gyroscope output information along with the accelerometer information. The exemplary mobile communications device 102 is also receiving GPS data points, which are outputs from its GPS receiver, as indicated by sequence of GPS data points 110, with an individual GPS data point being represented by a solid dot 112. GPS data points are generally available less frequently than accelerometer data points, e.g., due to the rate of determination and output of a GPS position fix by the GPS receiver, due to limitations of the locations where GPS signals can be detected from enough satellites to obtain an accurate time and/or an accurate GPS position fix, and/or due to interference.

An instantaneous mobile communications system position fix, based solely on a GPS receiver output may be obtained and sent to an AP. In addition, an instantaneous mobile communications device position fix may be obtained based on a last known position fix of the device and further based on inertial data, e.g., accelerometer and gyroscope data, collected and processed since the last known position fix. In some embodiments, the last known position fix is a high quality GPS position fix or a precisely known location, site or landmark, e.g., a start, destination or waypoint with known latitude/longitude coordinates.

GPS works by using a network of satellites to provide location and time information to a GPS receiver. The GPS receiver calculates its position by measuring the distance between itself and multiple satellites. However, GPS signals can be affected by factors such as interference from buildings and other obstacles, as well as atmospheric conditions. This can lead to errors in the GPS location information.

Accelerometers can help correct these errors by providing additional information about the car's motion. By measuring the rate of change of the car's velocity in different directions, the accelerometer can estimate the car's position more accurately than GPS alone. For example, if the GPS signal is temporarily lost due to an obstruction, the accelerometer can help estimate the car's position based on its last known location and its current velocity and direction of travel.

The resolution of an accelerometer, crucial for accurately tracking a car's path on the road, depends on the bit depth and full-scale range. A higher bit depth provides more precise measurements, with a 12-bit accelerometer offering a resolution of $\frac{1}{4096}$th of the full-scale range. The full-scale range sets the maximum and minimum measurable accelerations, usually in g-forces. A larger range yields smaller resolution per unit of acceleration. To calculate resolution, divide the full-scale range by the quantization levels represented by the bit depth. Real-world factors like noise, temperature, and non-linearities can affect actual resolution.

For instance, an accelerometer with a ±2 g range can measure accelerations from −2 g to +2 g.

Furthermore, accelerometers can also help improve the accuracy of GPS location information in areas where the GPS signal is weak or unavailable, such as tunnels or urban canyons. By measuring the car's motion and using inertial navigation techniques, accelerometers can estimate the car's position even when GPS signals are not available.

Access points (sometimes referred to as routers), e.g., WiFi APs, use different methods to preserve a wireless connection between a device and the network, even when the signal strength diminishes. Power management approaches are employed to regulate the power levels at which the AP (router) and device communicate. In cases where the signal strength drops below a specific level, the AP may boost its power output to maintain the connection. However, if the signal strength declines beyond a certain threshold, the connection may become inoperative.

Despite these methods, APs (routers) do not possess the capability to disconnect themselves from a device if they cannot transmit data packets. This means that if the connection becomes poor or unusable, it is the device's responsibility to determine whether to continue attempting to communicate with the router or search for a stronger signal. In certain instances, the device may choose to switch to a different network or access point if one is available.

The signal strength of each AP may change as the user moves around the network. If the signal strength of the current AP falls below a certain level, the device may switch to another AP that has a stronger signal. However, during the switching process, the connection may briefly interrupt, leading to a blind zone.

In general, the process of switching from one AP to another in a Wi-Fi network may result in blind zones for users, particularly if the network is not adequately designed or configured. Minimizing the impact of these blind zones can be achieved by optimizing the placement and configuration of APs, and employing mechanisms to lessen interruptions during switching.

Figure 2:
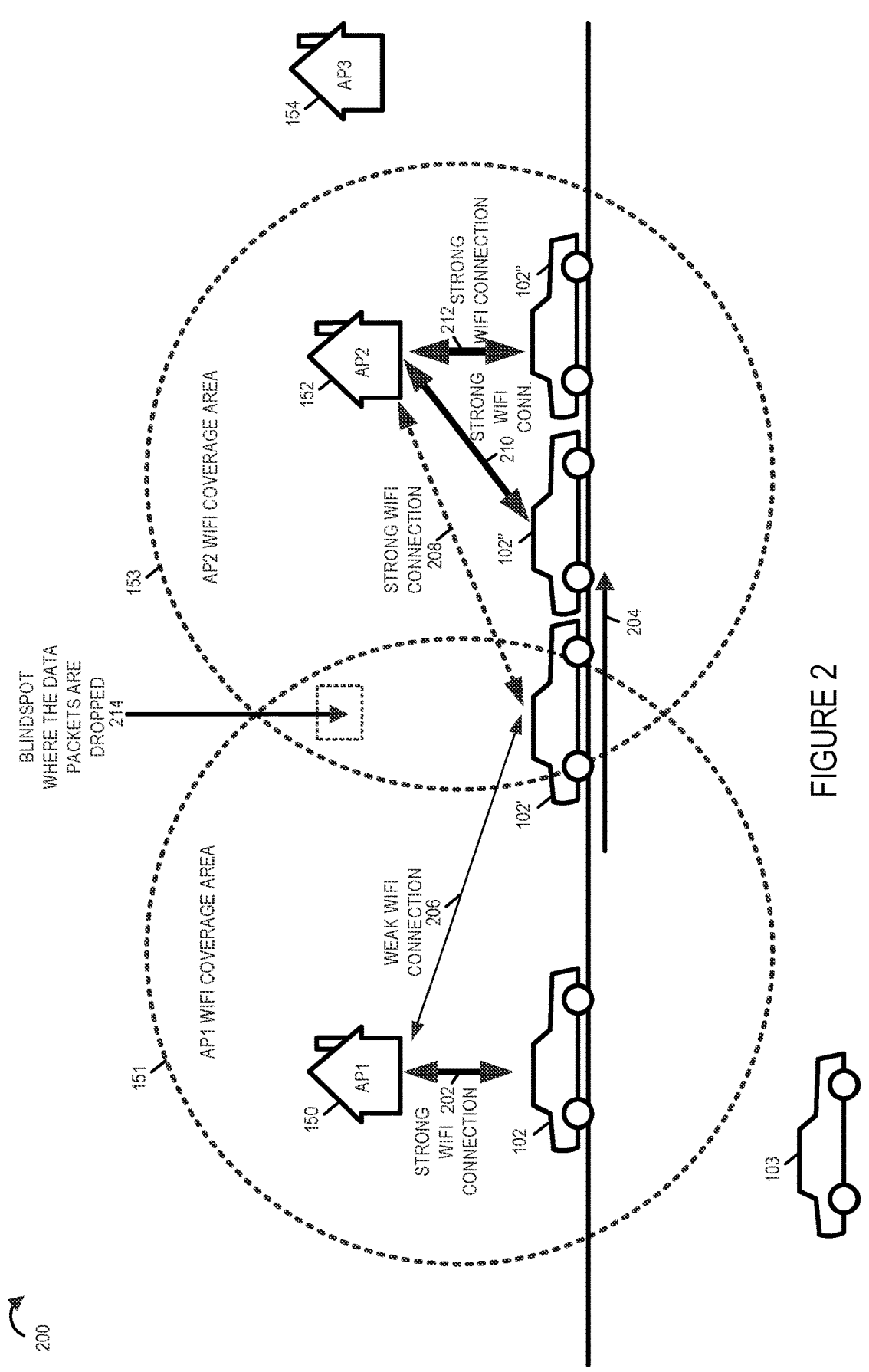

FIG. 2 illustrates an exemplary system 200 in accordance with an exemplary embodiment. Exemplary system 200 includes a plurality of access points including AP1 150, AP2 152 and AP3 154. Each of the APs has a corresponding WiFi wireless coverage area. The AP1 WiFi wireless coverage area is represented by dashed line circle 151. The AP2 WiFi wireless coverage area is represented by dashed line circle 153. Exemplary system 200 further includes a plurality of mobile communications systems (mobile communications system 1 102, e.g., a first vehicle including a wireless communications device, e.g., a first WiFi UE, . . . , mobile communications system n 103, e.g., an nth vehicle including a wireless communications device, e.g., an Nth WiFi UE).

Mobile communications system 1 102, e.g., a first vehicle including a wireless communications device, is moving in the direction of arrow 204. The same exemplary mobile communications system 1 102 is shown at four different locations at four different points in time as it travels and is represented as mobile communications device (102, 102', 102", 102"'), at the (first, second, third, and fourth) locations, respectively.

At the first location mobile communications device 102 has a strong WiFi connection 202 with AP1 150. At the second location mobile communications device 102' has a weak WiFi connection 206 with AP1 150. At the second location mobile communications device 102' has a strong WiFi connection 208 with AP2 152. At the third location mobile communications device 102" has a strong WiFi connection 210 with AP2 152. At the fourth location mobile communications device 102′′′ has a strong WiFi connection 212 with AP2 152. In this example, WiFi connection 208 is stronger than WiFi connection 206; WiFi connection 210 is stronger than WiFi connection 208; and WiFi connection 212 is stronger than WiFi connection 210. In this example, there is also a blindspot 214 where data packets are dropped.

Figure 3:
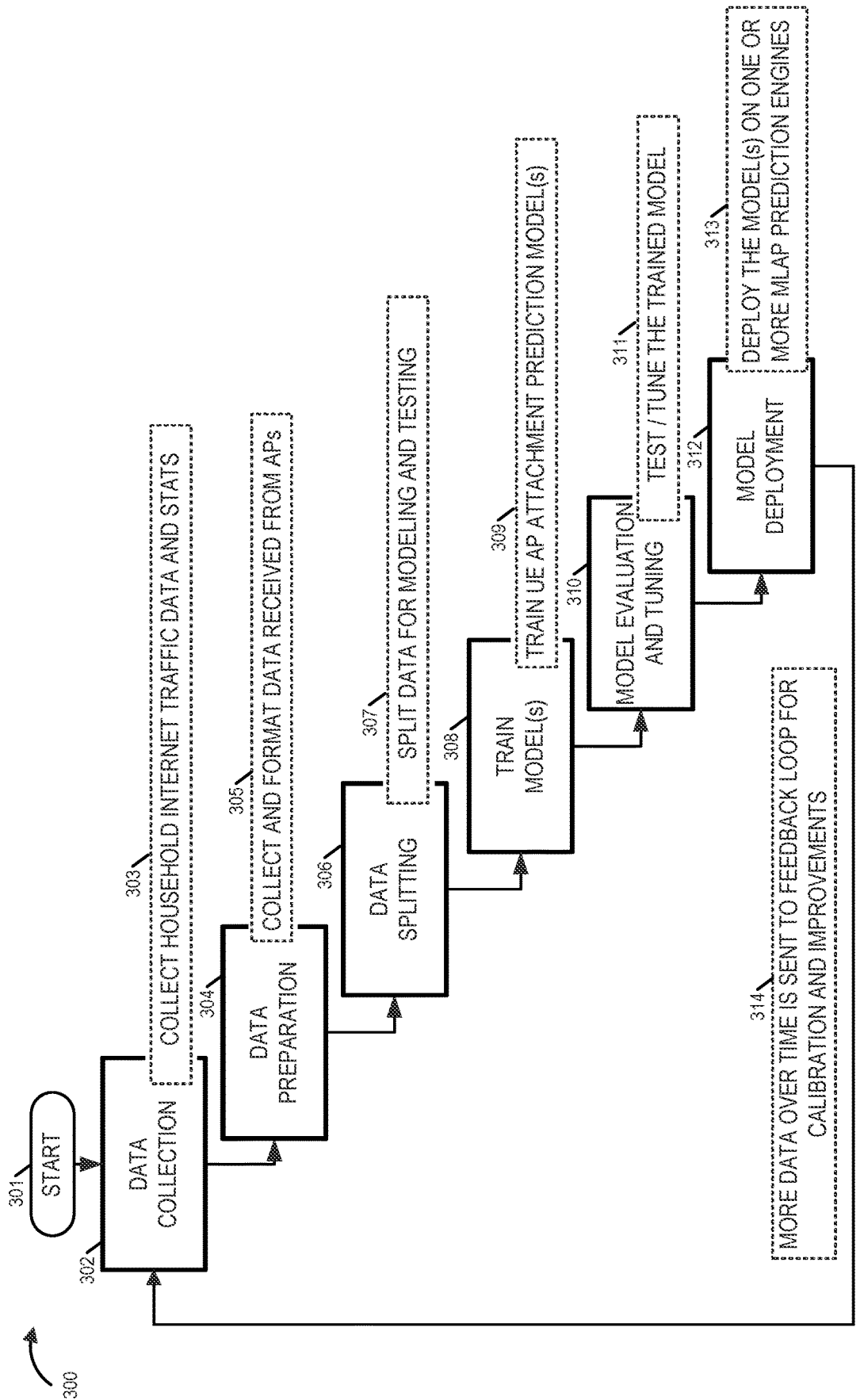

FIG. 3 is a drawing 300 which illustrates an exemplary method of generating and deploying a machine learning model(s) for recommending handoffs for mobile communications systems between access points APs (e.g., WiFi APs), in accordance with an exemplary embodiment. The exemplary method is performed by a communications system including a plurality of mobile communication systems, e.g., vehicles which include a wireless communications device, a plurality APs, a machine learning access point (MLAP) model training device, and one or more MLAP prediction engines. In some embodiments, the MLAP model training device and the MLAP prediction engine are located in network node which is part of a cloud/network core. In some other embodiments, the MLAP training device is located in a network node which is part of cloud/network core, and a MLAP prediction engine is included in each AP. Operation of the exemplary method starts in step 301, in which the communications system is powered on and initialized and proceeds to step 302.

In step 302 each of the APs are operated to collect data. Step 302 includes sub-step 303 in which each of the APs collects household Internet traffic and statistics. Each AP collects data on individual devices (e.g., individual mobile communications systems and other UE devices), which are being served by the AP. Collected data includes, e.g., information received from client devices including vehicles relating to reported location, speed, direction of travel, acceleration, detected APs and corresponding RSSIs to which they are connected, along with locally available information at the AP such as vehicle arrival time at the AP and departure time from the AP, amount of data communicated by the vehicle, latency with regard to communications with APs and/or AP loading information. The AP collected data, which includes received data from client devices including mobile communications systems, and AP sourced data, is communicated, e.g., sent, from the APs to the MLAP model training device. Operation proceeds from step 302 to step 304.

In step 304, the MLAP model training device receives the AP collected data and performs data preparation operations. Step 304 includes sub-step 305, in which the MLAP model training device performs data collection and formatting operations on the data received from the APs. As part of the data preparation the MLAP model training device pre-processes the received collected data to ensure that the data is in a suitable format for analysis. Data collected from different devices and/or APs is put into a consistent format for model training. Data corresponding to individual vehicle connections with an AP are labeled with good/bad labels based on reported RSSIs, data rates achieved and/or traffic latency. Operation proceeds from step 304 to step 306.

In step 306 the MLAP model training device performs data splitting. Step 306 includes sub-step 307, in which the MLAP model training device splits data for modeling and testing, e.g., the MLAP model training device splits the pre-processed formatted data into training and testing/model validation training sets. Operation proceeds from step 306 to step 308.

In step 308 the MLAP model training device trains model(s). Step 308 includes sub-step 309 in which the MLAP model training model trains one or more UE AP attachment prediction models. Each MLAP model is trained on the data to learn the patterns and relationships between the data features. This step is crucial in ensuring that the model is accurate and can make predictions that are reliable.

After training the model(s), operation proceeds from step 308 to step 310, in which the MLAP model training device performs model evaluation and tuning. Step 310 includes sub-step 311 in which the MLAP model training device tests/tunes the trained model(s). The MLAP model training device tests each trained model and evaluates each model's performance using a validation set to ensure that it can accurately predict new data. Hyperparameter tuning is then carried out for each model to improve the model's performance. Operation proceeds from step 310 to step 312.

In step 312 the model(s) are deployed. Step 312 includes sub-step 313, in which the model(s) are deployed in one or more MLAP prediction engines. For example, the model(s) are communicated from the MLAP model training device to the MLAP prediction engine in the network node of the cloud/network core, stored in the MLAP prediction engine in the network node of the cloud/network core, and the models are activated and used to make predictions, e.g., in real-time. Alternatively, the MLAP prediction engines may be located in APs, and each model is communicated from the MLAP model training device to one or more corresponding MLAP prediction engines located within one or more APs, stored in the MLAP prediction engines in the APs, and the models are activated and used to make predictions, e.g., in real-time.

Overall, the process of FIG. 3 involves a careful and systematic approach to ensure that the MLAP model(s) are accurate, reliable, and can make predictions that are useful in managing network traffic efficiently.

Operation proceeds from model deployment step 312 back to data collection step 302, and more data over time is sent to a feedback loop for calibration and improvements, as indicated by information block 314.

Figure 4:
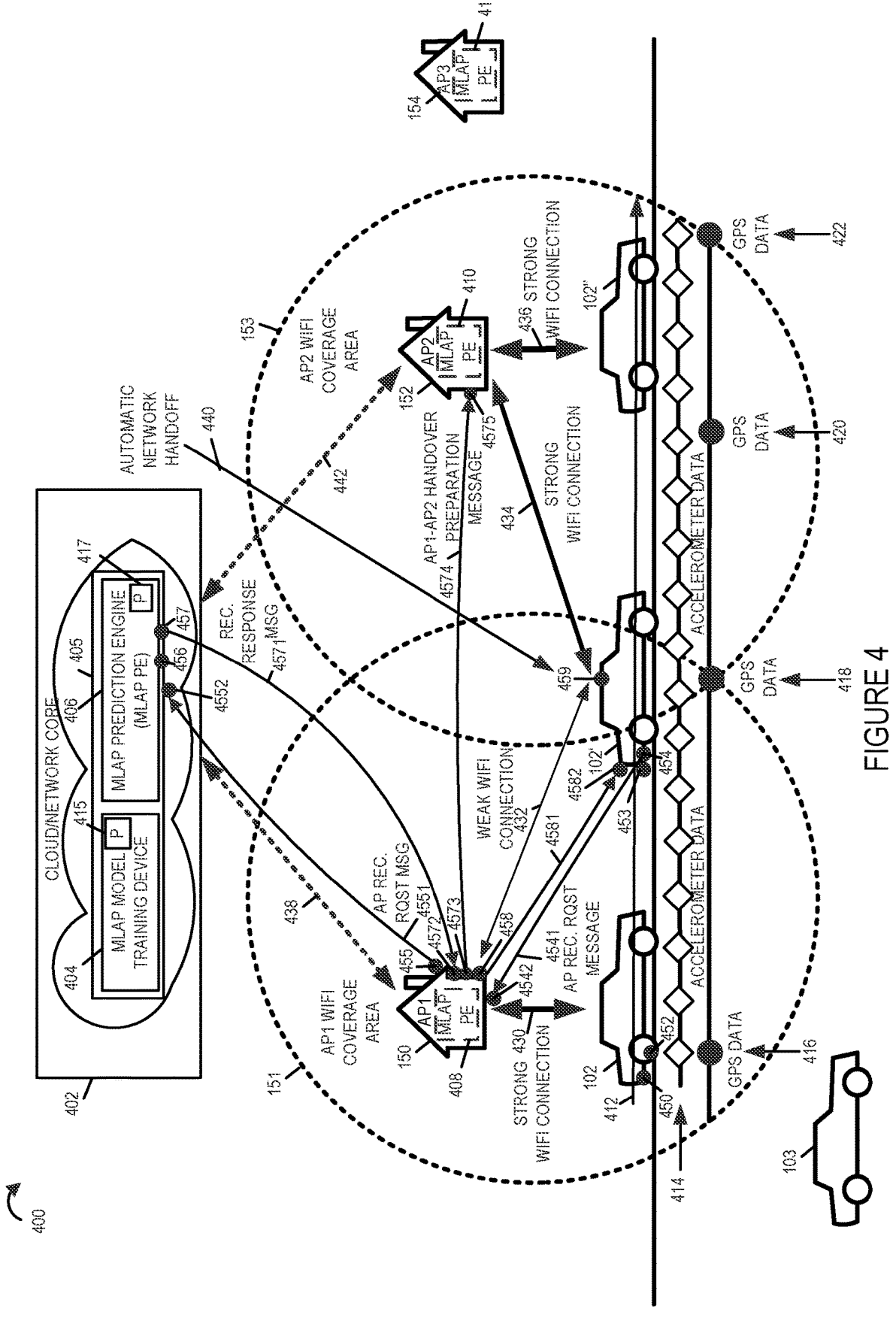

FIG. 4 illustrates an exemplary communications system 400 in accordance with an exemplary embodiment. Exemplary communications system 400 includes a cloud/network core 402 including network node and/or cloud compute node 405 which includes a machine learning access point (MLAP) model training device 404 and a MLAP prediction engine (PE) 406. The MLAP model training device includes a processor 415 which controls MLAP model training device operation while the MLAP PE 406 includes a processor 417 which controls the operation of the MLAP PE 406. Exemplary communications system 400 further includes a plurality of access points including AP1 150, AP2 152 and AP3 154. Each of the APs has a corresponding WiFi wireless coverage area. The AP1 WiFi wireless coverage area is represented by dashed line circle 151. The AP2 WiFi wireless coverage area is represented by dashed line circle 153. In some embodiments, each of the APs includes a MLAP PE. For example, in some embodiments, AP1 150 includes MLAP PE 408, AP2 142 includes MLAP PE 410, and AP3 154 includes MLAP PE 411. Exemplary system 400 further includes a plurality of mobile communications systems (mobile communications system 1 102, e.g., a first vehicle including a wireless communications device, e.g., a first WiFi UE, . . . , mobile communications system n 103, e.g., an nth vehicle including a wireless communications device, e.g., an Nth WiFi UE). AP1 150 is coupled to cloud/network core 402 via communications path 438, e.g., a wireline link, fiber optic link, wireless link and/or Internet path. AP2 152 is coupled to cloud/network core 402 via communications path 442, e.g., a wireline link, fiber optic link, wireless link and/or Internet path.

Mobile communications system 1 102, e.g., a first vehicle including a wireless communications device, is moving in the direction of arrow 412. Accelerometer data is collected continuously by mobile communications device 102 along path 412, as indicated by sequence 414 of accelerometer data points, indicated by diamonds. GPS data (GPS data points (416, 418, 420, 422)) is determined intermittently, e.g., by the GPS receiver in mobile communications device 102, e.g., when a GPS time and position fix above a predetermined quality level can be obtained and in accordance with the GPS output data rate of the GPS receiver. The same exemplary mobile communications system 1 102 is shown at three different locations at three different points in time as it travels and is represented as mobile communications device (102, 102', 102"), at the (first, second, and third) locations, respectively.

At the first location mobile communications device 102 has a strong WiFi connection 430 with AP1 150. At the second location mobile communications device 102' has a weak WiFi connection 432 with AP1 150. At the second location an automatic network handoff of mobile communications device 102' from AP1 150 to AP2 152 is performed, as indicated by arrow 440, e.g., in accordance with present invention, e.g., based on a MLAP PE AP prediction recommendation in response to an AP recommendation request, triggered by a RSSI value below a threshold. At the second location mobile communications device 102' has a strong WiFi connection 434 with AP2 152. At the third location mobile communications device 102''' has a strong WiFi connection 436 with AP2 152. In this example, WiFi connection 434 is stronger than WiFi connection 432; WiFi connection 436 is stronger than WiFi connection 434.

A step-by-step breakdown of an exemplary method of using direction/speed of the car (mobile communications system 102) to connect to an AP (e.g., AP2 152), as part of an automatic network handoff in accordance with the present invention, will now be described.

In step 450 the car (mobile communications system 102) is connected to AP1 150 via strong Wi-Fi connection 430 and begins moving in the direction of arrow 412.

In step 452 the car's (mobile communications system 102) GPS records its location (see GPS data point 416), and the accelerometer data/speed data (derived from accelerometer data points of the sequence of measured accelerometer data points) is used and attached to precisely draw the car's path.

In step 453, as the car (mobile communications system 102) moves, the RSSI (Received Signal Strength Indicator) of AP1 150, as measured by mobile communications system 102, decreases below a certain threshold, e.g., an AP recommendation inquiry threshold, and the car (mobile communications system 102) detects that this threshold has been crossed. Operation proceeds from step 453 to step 454, in response to the detected RSSI value below the threshold.

In step 454 the car's (mobile communications system 102) Wi-Fi sends an AP recommendation request message 4541 including information about the decreasing RSSI to the. AP1 150. In step 4542 AP1 150 receives the AP recommendation request message 4541 and recovers the communicated information.

In step 455 AP1 150 communicates, e.g., forwards, the AP recommendation request message 4541, as message 4551, to a MLAP prediction engine (MLAP PE) 408 or MLAP PE

406. In step 4552 the MLAP PE 406 receives the AP recommendation request message 4551 and recovers the communicated information.

In step 456, the MLAP PE 408 or MLAP PE 406 processes the location data and determines which access point (AP), from among a plurality of alternative access points, would be the most efficient for the car (mobile communications system 102) to connect to, e.g., AP2 152 is the recommended predicated AP for handover, and generates a recommendation request response message 4571 including information indicating the predicted AP for handover, e.g., AP2 152, and in some embodiments, further including a predicted location and a predicted time for the handover.

In step 457, the recommendation request response message 4571, e.g., including information (e.g., a MAC address corresponding to AP2 152) indicating that the predicted AP for handover is AP2 152, information indicating the predicted location of handover and information indicating the predicted time of handover is sent, by the MLAP PE 406 back to AP1 150 (for the case in which the MLAP PE is MLAP PE 406 located in cloud/network core 402) or is sent to the processor in AP1 150 for the case in which the MLAP PE is MLAP PE 408 located within AP1 150). In step 4572 the AP1 150 or the processor in AP 1 140 receives the recommendation request response message 4571 and recovers the communicated information. In step 4573 AP1 150 generates and sends (e.g., via a backhaul connection link between AP1 150 and AP2 152) a handover preparation message 4574 to AP2 152, said handover preparation message including information identifying AP1 150 are the source AP in the handover, a predicted handover time, a predicted handover location, mobile communications system (vehicle) 102 identification information, and context and/or subscriber information corresponding to the mobile communications device (vehicle) 102, to allow AP2 152, which is the handoff target, to prepare for the handoff. In some embodiments the handover preparation message 4574 includes information including prediction information from the AP recommendation request response message 4571 plus supplemental context and/or subscriber information available at AP1 150. In step 4575 AP2 152 receives the handover preparation message 4574, recovers the communicated information and prepares for the handoff.

In step 458 AP1 150 sends the recommendation request response message 4581, e.g., a forwarded copy of message 4571, to the car (mobile communications system 102), which receives the message 4581 and recovers the communicated information in step 4582.

In step 459 the car (mobile communications device 102) disconnects from AP1 150 and attempts to connect to the AP2 152 based on unique MAC address (corresponding to AP2 152 recommended by the MLAP PE (406 or 408), which was included in the received response message 4581).

This process avoids any network blind spots, and the process is repeated as the RSSI of AP2 152, as measured by mobile communications system 102, falls below the threshold, e.g., the AP recommendation inquiry threshold.

Figure 5:
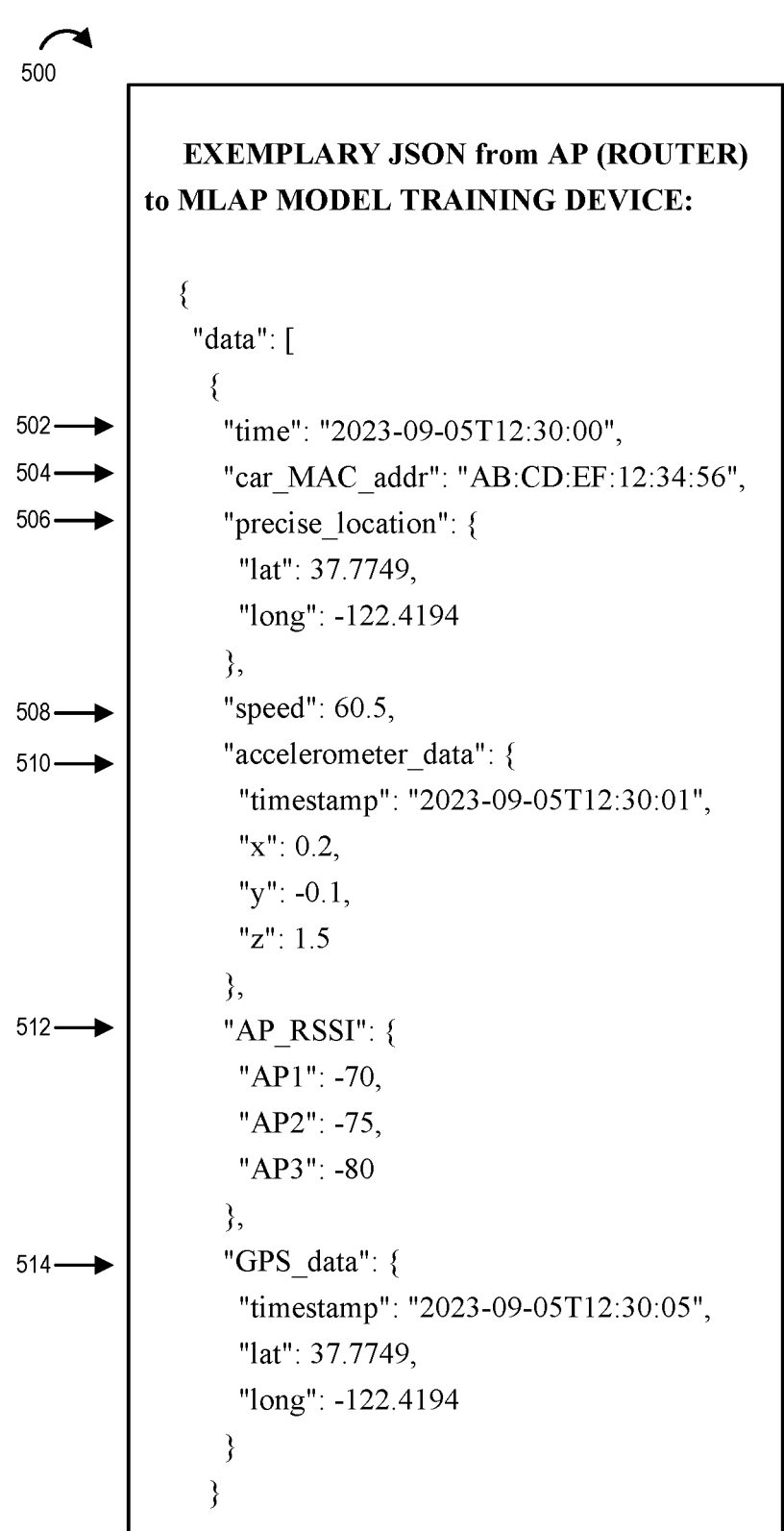

FIG. 5 is a drawing of an exemplary JSON 500 illustrating exemplary message formats and including exemplary data, e.g., originally sourced from a mobile communications system, e.g., a vehicle including a WiFi UE, to be communicated from an AP (router), e.g., AP1 150 to a MLAP model training device, e.g., MLAP model training device 404. Exemplary JSON 500 includes time information 502, a MAC address 504 of the mobile communications system (car), precise location information 506 of the mobile communications system (car) including latitude and longitude coordinates corresponding to the time information, speed information 508 (e.g., in mph) of the mobile communications system (car), accelerometer data information 510 including a timestamp, and a set of accelerometer data corresponding to an x, y, z triad of orthogonal accelerometers, a set 512 of AP RSSI measured values corresponding to APs which can be detected by the WiFi receiver of the mobile communications system (car), and GPS data 512 including a timestamp, a latitude value and a longitude value, e.g., corresponding to the most recent GPS position fix determined by the GPS receiver in the mobile communications system. In some embodiments, the precise location 506 is based on inertial measurement information, e.g., from gyroscopes and accelerometers, and a previous known position fix, e.g., a prior GPS position fix and or a known location, e.g., a known starting point location (e.g., home location) or known waypoint location along a route.

FIG. 6 is a drawing of an exemplary JSON 600 illustrating exemplary message formats and including exemplary data to be communicated from a MLAP prediction engine, e.g., MLAP PE 406, to an AP, e.g., AP1 150. Exemplary JSON 600 is, e.g., generated and sent by MLAP PE 406, to AP1 150 in an AP recommendation request response message, e.g., AP recommendation request response message 4571, in response to a previously received AP recommendation request message, e.g., AP recommendation request message 4551. Exemplary JSON 600 includes time information 602, a MAC address 604 of the mobile communications system (car), precise location information 606 including a latitude value and a longitude value, speed information 608, a predicted future location 610 including latitude and longitude coordinates, e.g., indicating the future location where the handover should occur, information 612 indicating the AP (with the degrading connection quality), e.g., AP1 150, to which the recommended prediction data is to be sent and from which the handover is to occur, authentication information 614, e.g., indicating an authentication protocol and/ or an authentication key to be used, and prediction information 616 including the location (e.g., latitude and longitude coordinates) of the predicted (selected and recommended) AP, e.g., AP2 152, to which the handover is to occur, information 616 indicating a predicted time (e.g., in seconds) until the connection occurs, and information 618 (e.g., an AP ID or AP name associated with a MAC address) identifying the predicted (selected and recommended) AP, e.g., AP2 for the handover. In some embodiments, the information identifying the predicted (selected and recommended) AP is a MAC address. In some embodiments response message 600 can include additional handoff information relating to a handoff from a second AP to a third AP to be performed as the vehicle 102 travels along a path to a destination. The additional handoff information can include the location and/or time at which the additional handoff to AP3 is to occur. When the path extends a long distance still more handoffs can be predicted and the information included in response message 600 providing information about predicted handoffs and APs to which the vehicle 102 should attach as it travels to a destination.

Figure 7A:
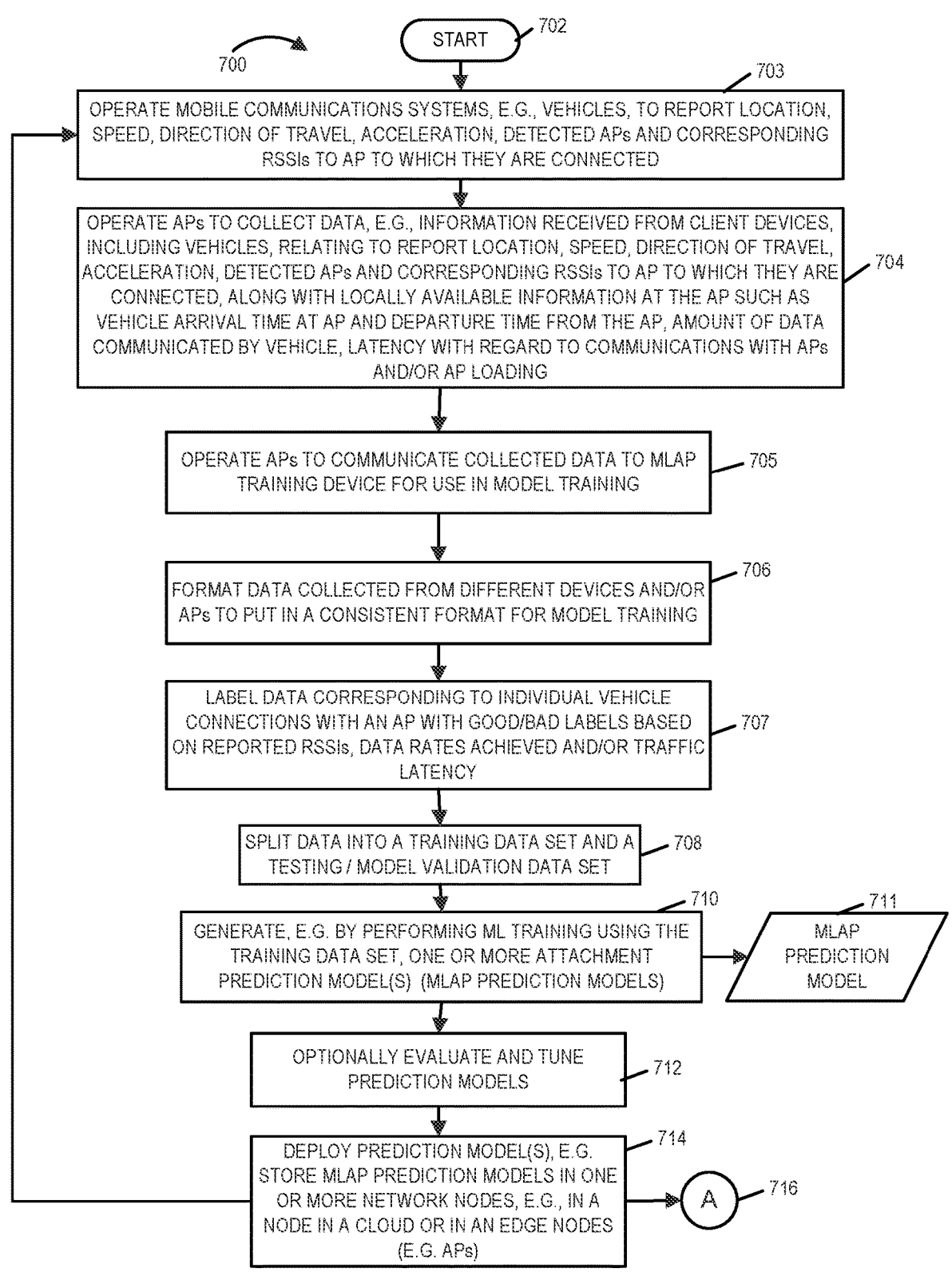

FIG. 7 illustrates an exemplary method of supporting and implementing handoffs of mobile communications systems, e.g., vehicles 102, 103, 800 which include a wireless communications device or wireless interface 820, as the vehicles move through an environment, e.g., along a road 104 or other travel path.

The method 700 begins in start step 702 in which the cloud based MLAP model training device 404 begins operating. Then in step 703 mobile communications systems, e.g., vehicle 102, and/or other devices, e.g., vehicle 103, using an AP 150, 152, 154 report information to the AP to which they are connected. Each individual mobile communications system reports its location, speed, direction of travel, acceleration, detected APs and RSSIs corresponding to individual detected APs along with communications identifier information, e.g., a MAC address of the vehicle. The reported information communicated to the access point by the vehicle reporting the information is associated with or includes time stamp information indicating the time or times to which the reported information corresponds.

In step 704 the APs 150, 152, 154 are operated to collect data, e.g., information received from client devices including mobile communications systems such a vehicle 102 and/or other devices. The information collected relating to vehicles includes the information discussed with regard to step 703. Thus, the APs 150, 152, 154 collect, for individual client devices, reported device location, speed, direction of travel, acceleration, APs detected by the device and corresponding RSSIs and/or other things. The APs 150, 152, 154 also collect information locally available at the AP such as vehicle/client device arrival time at the AP and vehicle/client device departure time. The AP can also collect information about a device's utilization of services such as the amount of data communicated by a vehicle, latency with regard to communications with the AP and/or AP loading. From the collected information a reasonable understanding of AP loading and the quality of service provided to vehicles at various locations and points in time can be determined. The data collected by individual APs 150, 152, 154 is communicated from the AP that collected the data to the MLAP model training device 404 in step 705. Operation proceeds from step 705 to step 706 in which the MLAP model training device 404 formats the collected received from different APs and corresponding to various mobile communications systems into a consistent format which is suitable as input for training of one or more models used to predict which AP a vehicle should use based on the vehicle's location.

With the collected data formatted in a consistent manner, operation proceeds from step 706 to step 707. In step 707 data corresponding individual vehicles and locations is labeled as corresponding to a good or bad connection based on reported RSSI associated with the connection to which the data relates, data rates achieved and/or traffic latency. In this way there is input which can be used for model training indicating which AP selections resulted in a bad connection and should be avoided when trying to predict which AP should be used and data corresponding to good connections which can be used to determine which AP connections are likely to result in good results. The labeled data can now be used for training and/or model validation purposes.

Operation proceeds from step 707 to step 708 in which the labeled data from step 707 is split into training and testing data sets, e.g., a first set of data used to train the AP prediction model or models with the remaining data being available and designated as a validation set of data. The validation data set, which is not used for training, allows a check to be made, e.g., a generated model is used to predict which AP should be used for a given vehicle location and then the validation set is used to determine if the predicted AP was one which provided good results for the input location which makes a location in the validation data set.

With the data split into a training set and a validation set, operation proceeds to training step 710 where a model 711 is generated, that is trained or retrained, based on the training set of data. Initial training results in an initial MLAP prediction model or set of MLAP prediction models where the individual models correspond to different geographic areas. Model 711 represents a model generated in step 710 which can be, and sometimes is, stored in and used by MLAP PEs 406, 408, 410 and/or 411. Where the prediction operations are implemented in a cloud system use of a single model for a large area may be desirable but in cases where the model or models are loaded into APs so that predictions can be made in network edge devices rather than by a node in a computing cloud, multiple small models corresponding to small geographic areas can be generated and deployed, e.g., in APs in the relatively small coverage area. Since handoffs are often between nearby WiFi access points there may be no need, in the case of AP implemented MLAP prediction engines for the individual prediction model used in an AP to cover a large geographic area.

The use of small prediction model covering a relatively small geographic area has the advantage of reduced size and computing complexity as compared to an AP prediction model covering a large geographic area. The AP prediction model can be used to predict what AP a vehicle should handover to and the location at which the handover should occur. The time to the recommended handover can be, and sometimes is, predicted as well by the prediction model.

With the AP model or models having been generated in step 710, operation moves to optional step 712 which can be skipped in some embodiments. In step 712, when it is performed, the generated prediction models are evaluated using the labeled data that was reserved for validation proposes. The models are checked by entering a vehicle location that is included in the validation set and determining if the model predicts an AP that was known to have provided good results to a vehicle at the location. In step 712 the model can be tuned by adjusting parameters or performing additional training using some of the data reserved for validation if necessary.

Operation proceeds from step 710 directly to model deployment step 714 in embodiments where evaluation step 712 is skipped and from step 712 to deployment step 714 when step 712 is performed.

In deployment step 714 the generated AP prediction model or models which can be used to predict what AP a vehicle should handover to, the location at which the handover should occur and the time to handover, are loaded into one or more MLAP prediction engines (MLAP PE) located in one or more network nodes such as network node 405 or APs 150, 152, 154. In some embodiments in which a cloud computing based approach is used the model is loaded into one or more MLAP PEs 406 in a network cloud or service provider network core. In some embodiments where network edge devices are used perform the predictions, the model or models relevant to an area in which the predictions are made are loaded into a MLAP PE in a network node such as an AP which can then use the model or models for prediction purposes.

Having generated and deployed the AP prediction model or models, operation proceeds to step 718 via connecting node A 716. Operation is also shown proceeding back from step 714 to step 703 to show that the collection of data and model training/retraining occurs on an ongoing basis allowing for new models to be generated and deployed based on collected data and/or training to refine the existing models based on collected data.

Figure 7B:
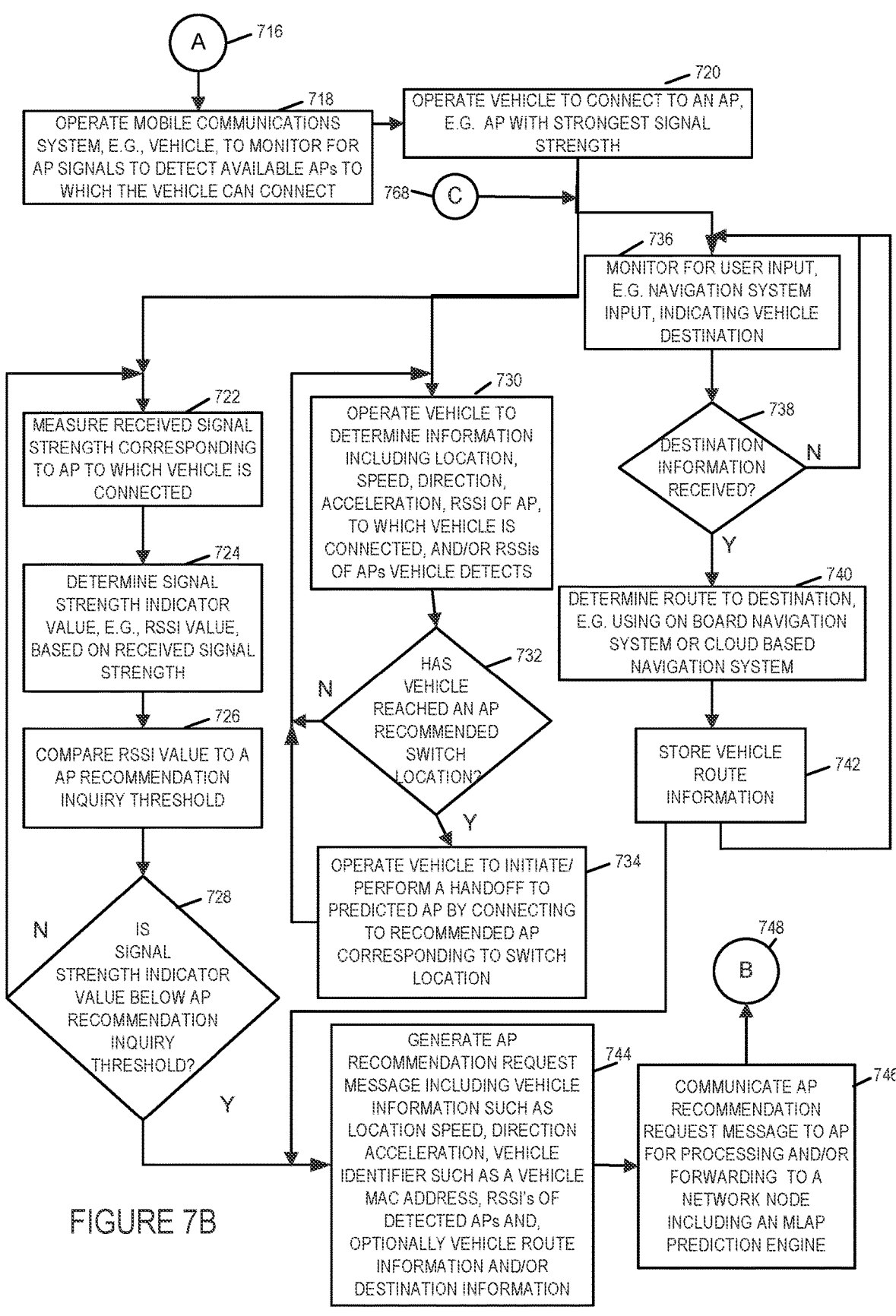

The steps shown in FIG. 7B relate largely to mobile communications system requests for AP recommendations and use of a MLAP prediction engine to provide a handover recommendation including an AP which is recommended for handover, the time the handover should occur relative to the time the recommendation is provided and the location at which the handover should be initiated by the vehicle based on the recommendation provided. In cases where a vehicle path to a destination is known and indicated to the recommendation engine, the MLAP PE 406 may recommend a sequence of handovers corresponding the vehicles predicted path to the known destination along with location and the predicted time at which each handover should be implemented.

In step 718 a mobile communications system, e.g., vehicle, is operated to monitor for AP signals to detect available APs to which the vehicle can connect. Step 718 may correspond, e.g., to the case where the vehicle is initially powered on and started. Operation proceeds from step 718 to step 720. In step 720, the vehicle 102 connects to an AP, e.g., an AP with the strongest signal strength. Operation proceeds from step 720, at which point the vehicle 102 is able to connect to the cloud and/or network core 402 via the AP 150, 152 or 154 to which it connected, to steps 722, 730, 736 which mark the start of parallel operations which can occur on an ongoing basis.

In step 722, the vehicle 102 measures the received signal strength corresponding to the AP 150, 152 or 154 to which it is connected. Then in step 724 the vehicle 102 determines an RSSI value form the measured received signal strength. Then in step 726 the RSSI value is compared to an AP recommendation inquiry threshold which is used to determine if a request for an AP recommendation should be sent to an MLAP prediction engine. In the case of a decreasing RSSI the comparison will result at some point in the RSSI value falling below the AP recommendation inquiry threshold. At this point the vehicle 102 still has adequate connectivity to the AP to which it connected to communicate with the MLAP prediction engine in the network core or in the AP to which the vehicle is connected which is sometimes referred to as a serving AP. Accordingly before loss of communication the vehicle will seek a recommendation as to what AP it should handoff to and when.

In step 728 the result of the comparison made in step 726 is checked. That is, in step 728 the vehicle determines if the signal strength indicator value, e.g., the determined RSSI value corresponding to the serving AP, is below the AP recommendation threshold. If the RSSI value is below the threshold level it triggers the vehicle to proceed to step 744 in which an AP recommendation request is generated. Thus, in response to a decreasing RSSI, when it drops below the threshold, the vehicle will seek an AP recommendation as to the next AP to which it should attached. The AP recommendation request allows the vehicle to take advantage of the ML prediction models to recommend an AP to use and the potential use in the recommendation process of network or AP loading information that may be available to the MLAP prediction engine 406 which is not available to the vehicle 102.

In step 728 if the signal strength indicator, e.g., RSSI value is not below the threshold, operation will proceed from step 728 back to measuring step 722. Thus measuring and checking of the threshold will be repeatedly performed when the vehicle is connected to an AP or, as a result of processing leading to connecting node C 768 after attachment to another AP as part of a handover as will be discussed further below.

Referring to AP recommendation request message generation step 744, in this step an AP recommendation request message is generated to obtain an AP handoff recommendation. The AP recommendation request message includes vehicle information such as vehicle location information, vehicle speed, vehicle direction of travel, a vehicle identifier such as a MAC address of the vehicle, RSSIs of APs detected by the vehicle along with AP identification information and optionally, in some embodiments route and/or destination information, e.g., obtained from a vehicle navigation system. In some embodiments the vehicle location information includes a GPS determined location, and information used to update the GPS location such as acceleration information and/or the updated location based on the speed of the vehicle.

Operation process from message generation step 744 to message communication step 746 in which the message is communicated from the vehicle to the service AP for processing, e.g., in the case where the AP includes an MLAP prediction engine 408 or 410 and/or forwarding to a network node including an MLAP prediction engine 406 which is normally the case in a cloud based MLAP prediction engine embodiment. Operation will proceed from message communication step 746 to step 750 via connecting node B 748. However before discussing step 750 we will return to a discussion of some of the other steps shown in FIG. 7B.

As previously noted from step 720 operation proceeds in parallel to steps 730 and 736. In step 730 the vehicle determines information including location, speed, direction, acceleration, RSSI of the AP to which the vehicle 102 is connected and/or RSSIs of the APS the vehicle 102 detects. Thus, should vehicle 102 decide to send an AP recommendation request message it will have this information available. In addition, the vehicle can use the location information to determine if it has reached a recommended AP switch location, e.g., location where it is to initiate a handoff in accordance with an AP recommendation from an MLAP prediction engine. In step 732 the vehicle location is checked to determine if the vehicle has reached an AP recommended switch location. If it is determined in step 732 that the vehicle has not reached an AP switch location operation will proceed to back to information determination step 730 which is performed on a recurring basis. However, if it is determined in step 732 that the vehicle has reached an AP switch location operation will proceed to handoff initiation step 734. In step 734 the vehicle initiates and/or performs a handoff to a predicted AP which was recommended by an MLAP prediction engine, e.g., proceeds with a handoff which was recommended by the MLAP prediction engine. As a result of the handoff to the recommended AP, the recommended AP will become the serving AP for the vehicle.

Operation is shown proceeding from handoff step 734 back to vehicle information determination step 730 since this step is performed repeatedly regardless of which AP 150, 152 or 154 the vehicle 102 is connected to.

Referring now to step 736, this monitoring step is performed on a recurring basis. In step 736 the vehicle monitors for user input, e.g., navigation system input, indicating a vehicle destination. In step 738 a check is made to determine if destination information was received. If destination information was not received operation proceeds from step 738 back to monitoring step 736. However, if in step 738 it is determined that destination information was received, operation proceeds to step 740 in which the vehicle navigation system determines a route to the user, e.g., driver, indicated destination. The route may be determined by an on-board navigation system or by a cloud based navigation system to which the vehicle connect via the serving AP 150, 152 or 154. In step 742 the vehicle route is stored, e.g., for use in controlling vehicle navigation and/or for use in providing information to be included in a AP recommendation request message. Operation is shown proceeding from route information storage step 742 back to monitoring step 736 but also to step 744 in which an AP recommendation request is generated. This is because entry of a new route can trigger the generation and sending of an AP recommendation request so that the vehicle 102 will be able to obtain and use information about a recommend AP for handover purposes consistent with the newly entered route.

Figure 7C:
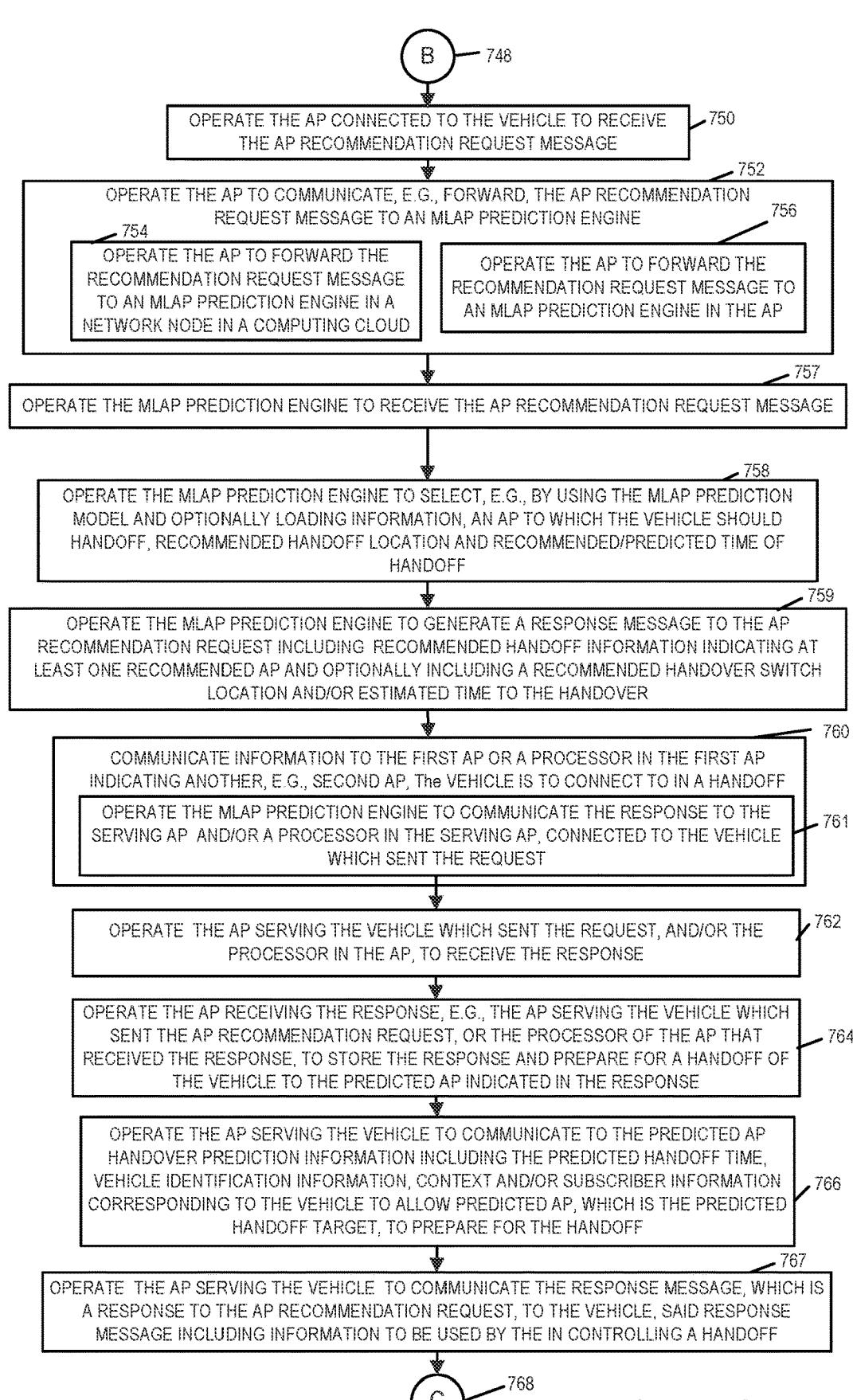

Referring now once again to step 750 of FIG. 7C which shows steps related to processing and responding to an AP recommendation message it can be seen that in step 750 the AP connected to the vehicle, e.g., the source AP for a handoff, receives the AP recommendation request message from the vehicle 102. The in step 750 the AP communicates, e.g., forwards, the AP recommendation request message to an MLAP prediction engine 406, 408, 410 or 411 which stores or has access to the previously generated MLAP prediction model or models. In the case of a cloud based MLAP prediction engine embodiment, step 752 will include step 754 which involves the serving AP forwarding the received AP recommendation request message to an MLAP prediction engine 406 in a network node 405 in a cloud computing system or network core 402. In the case where AP MLAP prediction engines 408, 410, 411 are used, step 752 will include step 756 in which the serving AP forwards the received AP recommendation request message to an MLAP prediction engine 408 or 410 or 411 in the AP which received the AP recommendation request. Such an edge based recommendation process can be useful where it is desirable for fast response times and/or it may be desirable to avoid sending large numbers of requests to a cloud or network core 402.

Operation proceeds from step 752 to step 757, in which the MLAP prediction engine to which the AP recommendation request message was communicated, e.g., forwarded, receives the AP recommendation request message and recover the communicated information. Operation proceeds from step 757 to step 758.

In step 758 the MLAP prediction engine to which the AP recommendation request was sent predicts one or more APs to which the vehicle should handoff, the location at which the handoff should be performed and/or the time to the handoff. In many cases the response message will include a single AP has a recommended handoff target. However, in the case where the AP recommendation request message indicates a vehicle path to a destination, in some embodiments the response message will include a series of recommended handoffs and corresponding location information along the known path to the destination. In this way the vehicle and be made aware of multiple potential recommended handoffs in a single response avoiding the vehicle to seek additional recommendations in the absence of a change in the vehicle path or in the event connectivity to an AP is lost unexpectedly and the vehicle can not seek an AP recommendation due to a temporary loss in network connectivity.

Operation proceeds from step 758 to step 759, in which the MLAP predication engine generates a response message to the AP recommendation request message including recommended handoff information indicating at least one recommended AP and optionally including a recommended handover switch location and/or estimated time to the handover. Operation proceeds from step 759 to step 760, in which the MLAP prediction engine communicates the generated response including the recommended AP handoff target to the serving AP and/or the processor in the serving AP. As should be appreciated in the case where the MLAP prediction engine is in the serving AP the response will be sent to the processor in the serving AP but in the case where the MLAP prediction engine is outside the serving AP the MLAP prediction engine will communicate the response including the handoff recommendation to the serving AP and thus the provide the information to the processor in the serving AP. In some embodiments step 760 includes step 761 in which the MLAP PE communicates the response including the predicted handoff information to the serving AP 150 and/or to a processor in the serving AP 150, which is connected to the vehicle 102 which sent the request for an AP handoff recommendation. Operation proceeds from step 760 to step 762.

In step 762 the serving AP or the processor in the serving AP receives the response message including the recommended handoff information identifying the AP to which a handoff is to be performed upon reaching the indicated location.

Operation proceeds from step 762 to step 764. In step 764 the AP receiving the response message, i.e., the serving AP, e.g. AP1 150, or the processor in the serving AP, e.g. AP1 150, will store the response and prepare for a handoff of the vehicle 102 to the predicted AP, e.g. AP2 152, indicated in the response message.

In step 766 the serving AP, e.g., AP1 150, then communicates to the predicted AP, e.g., AP2 152, handover prediction information including the predicted handover time. vehicle identification information, context information and/or subscriber information corresponding to the vehicle which sent the AP prediction request to allow the predicted AP, which is the handoff target, to prepare for the vehicle handoff. Operation proceeds from step 766 to 767.

In step 767 the AP recommendation request message response is sent to the vehicle 102 to provide it with the recommend handoff AP information as well as the location and time at which the handoff is expected to occur. Operation is seen proceeding from step 767, via connecting node C 768, back to steps 722, 730, and 738 which are performed on a recurring basis. The switch location information is used in step 732 to determine if a handoff is to be implemented by the vehicle while the returned recommended AP information is used to determine what AP should be the target of the handoff that is triggered by reaching the recommended handoff location.

As should be appreciated by using stored machine learning AP prediction models alone or in combination with other network information available to an MLAP prediction engine, improved handoff results can be achieved as compared to embodiments where vehicles make handoff decisions based on signal strength and/or loss of connectivity to an AP.

Figure 8:
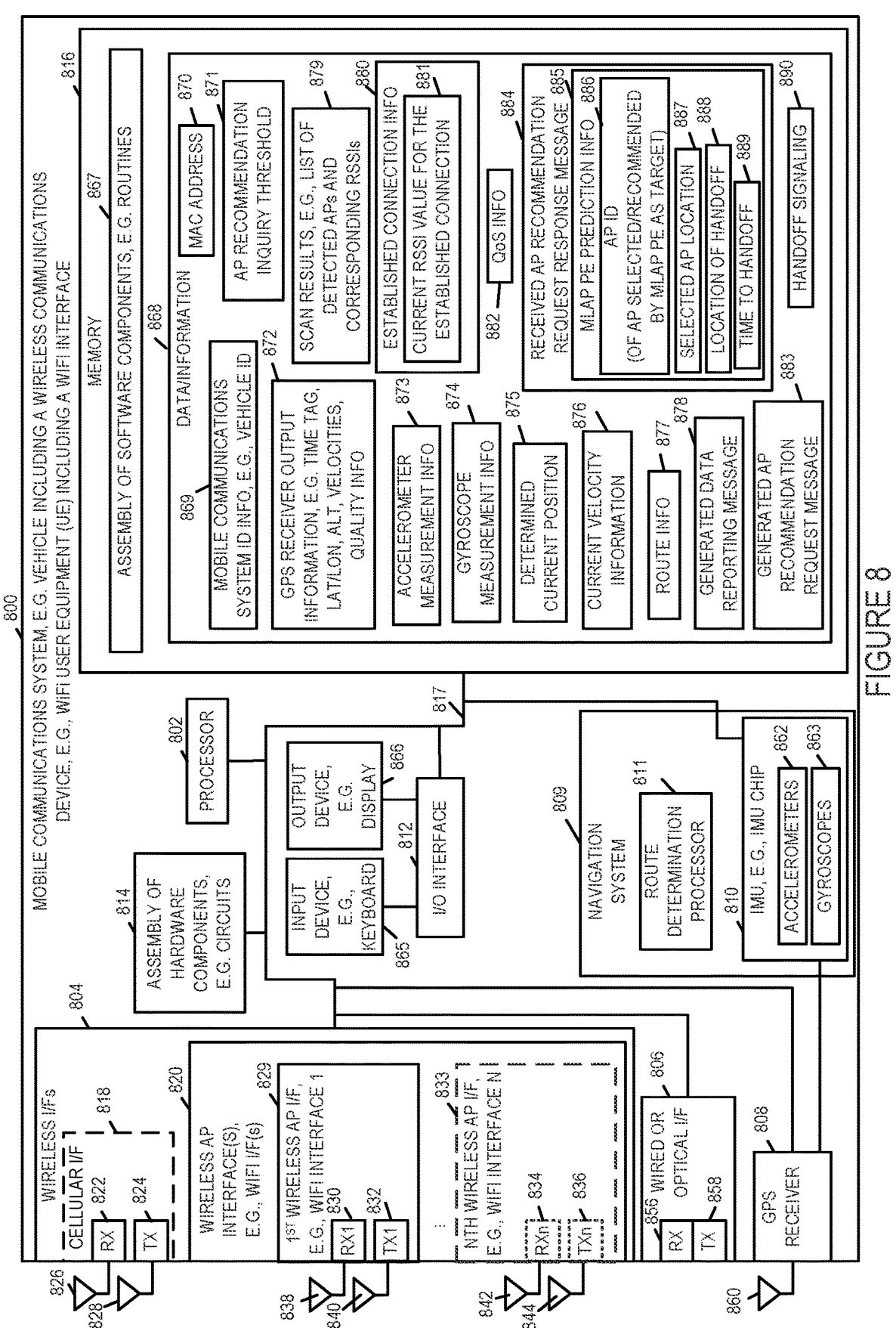

FIG. 8 is a drawing of an exemplary mobile communications system 800, e.g., a vehicle including a wireless communications device, e.g., a WiFi UE, in accordance with an exemplary embodiment. Exemplary mobile communications system 800 is, e.g., any of the mobile communications systems (mobile communications system 1 102, e.g., vehicle 1, . . . , mobile communications system n 103) of FIG. 1, FIG. 2 or FIG. 4, a mobile communications system, e.g. a vehicle, implementing: steps of the method of flowchart 300 of FIG. 3, steps of the method of flowchart 700 of FIG. 7, and/or steps of an exemplary method described with respect to operations and/or signaling of FIG. 4.

Exemplary mobile communications system 800 includes a processor 802, e.g., a CPU, wireless interfaces (I/Fs) 804, a wired or optical interface 806, a GPS receiver 808, an inertial measurement unit (IMU) 810, e.g., an IMU chip or an assembly of components including discrete accelerometers, discrete gyroscopes, interface circuitry and measurement circuitry coupled together, an input/output (I/O) interface 812, an assembly of hardware components 814, e.g., an assembly of circuits, and memory 816 coupled together via a bus 817 over which the various elements may interchange data and information.

Wireless interfaces 804 includes wireless access point (AP) interfaces 820. In some embodiments, wireless interfaces 804 further includes a cellular interface 818. The cellular interface 818 includes a receiver (RX) 822 and a transmitter (TX) 824. The receiver 822 is coupled to receive antenna 826 via which the mobile communications system 800 receives cellular downlink signals from a cellular base station. The transmitter 826 is coupled to transmit antenna 828 via which the mobile communications system sends cellular uplink signals a cellular base station.

Wireless AP interface(s) 820, e.g, WiFi interface(s), includes one or more wireless AP interfaces (1st wireless AP interface 829, e.g., WiFi interface 1, . . . , Nth wireless AP interface 833, e.g., WiFi interface N). In some embodiments different wireless AP interfaces correspond to different frequency bands, different protocols, and/or different technologies.

1st wireless AP interface 829, e.g., WiFi interface 1, includes a first wireless receiver/wireless transmitter pair (RX 1 830, TX 1 832) via which the mobile communications system 800 receives and sends wireless signals, e.g., WiFi signals, to an AP. RX 1 830 is coupled to receive antenna 838 via which the mobile communications system 800 receives wireless signals, e.g., WiFi signals. TX 1 832 is coupled to transmit antenna 840 via which the mobile communications system 800 transmits wireless signals, e.g., WiFi signals.

Nth wireless AP interface 833, e.g., WiFi interface N, includes an Nth wireless receiver/wireless transmitter pair (RX n 834, TX n 836) via which the mobile communications system 800 receives and sends wireless signals, e.g., WiFi signals, to an AP. RX n 834 is coupled to receive antenna 842 via which the mobile communications system 800 receives wireless signals, e.g., WiFi signals. TX n 836 is coupled to transmit antenna 844 via which the mobile communications system 800 transmits wireless signals, e.g., WiFi signals.

Wired or optical interface 806 includes a receiver 856 and a transmitter 858, which allows the mobile communications system 800 to be connected to a wired or optical line, e.g., when at a fixed location, e.g., at a repair facility or at a home site.

GPS receiver 808 is coupled to GPS antenna 860, via which the mobile communications system 800 receives GPS signals from GPS satellites. Based on the received GPS signals, the GPS receiver determines time, position (latitude/longitude/altitude) and velocity information. In some embodiments, the GPS receiver performs navigation functions and determines heading information and/or orientation information. In some embodiments, the GPS receiver 808 receives information from IMU 810 used in initializing navigation and/or aiding navigation computations, e.g., when GPS signals are lost or degraded.

In some embodiments the IMU 810 is part of a navigation system 809 which also includes a route determination processor for determining a travel route, e.g., path, from the vehicle's current location to a destination specified by a user, e.g., through input device 865. The destination and/or route information can be included in a request message seeking a prediction or recommendation as to what APs should be used along the path to the destination and when handoffs should be implemented between AP predicted to be good candidates for connections.

IMU 810 includes accelerometers 862, e.g., a triad of 3 orthogonal accelerometers, for measuring acceleration from which velocity information and/or change in position information can be, and sometimes is derived. IMU 810 also includes gyroscopes, e.g., 3 gyroscopes, for measuring rotations and for determining orientation (e.g., roll, pitch, heading) and determining changes in orientation, e.g., sensing the vehicle's direction, sensing a change in direction or sensing going into a turn. In some embodiments, navigation functions are performed by device 800, e.g., with computation being performed in processor 802 based on information received from GPS receiver 808 and IMU 810.

Mobile communications system 800 further includes an input device 865, e.g., a keyboard, and output device 866, e.g., a display. The various I/O devices 865, 866 are coupled to I/O interface 812, which couples the I/O devices to bus 817 and to processor 802.

Memory 816 includes an assembly of software components 867, e.g., routines, and data/information 868. Assembly of software components 867 includes non-transitory machine executable instructions, which when executed by processor 802 control the mobile communications system 800 to implement steps of a method, e.g., steps of the method of flowchart 300 of FIG. 3, flowchart 700 of FIG. 7, and/or steps described or shown with respect to the signaling diagram of FIG. 4, which are performed by a mobile communications system, e.g., a vehicle including a WiFi UE.

Data/information 868 includes mobile communications system ID information 869, e.g., a vehicle ID, a MAC address 870 corresponding to mobile communications system 800, an AP recommendation inquiry threshold 871, GPS receiver output information 872, e.g., a time tag, determined latitude, longitude, altitude, velocities, and quality information, e.g., characterizing the quality (accuracy) of the GPS position fix, accelerometer measurement information 873, e.g., accelerometer data points, gyroscope measurement information 874, a determined current position 875, e.g. determined based on a last known position fix and further using inertial measurement information, e.g. accelerometer and gyroscope information, current velocity information 876, route information 877, e.g., including a route path and a destination point, e.g., as part of a navigation system implemented within mobile communications system 800, a generated data reporting message 878, e.g., including, e.g., data such as in message 500, which is sent to a MLAP model training device via a serving AP, scan results 879, e.g. a list of detected APs and corresponding RSSIs, established connection information 880 including a current RSSI value 881 for the established connection, e.g. an established connection with AP1, QoS information 882 relating to mobile communications system 800 wireless UL/DL traffic data, a generated AP recommendation request message 883, e.g., including mobile communications system 800 ID information, current location information, current velocity information, detected RSSIs of potential target APs, and current RSSI of serving AP, said generated AP recommendation request message to be sent to a MLAP prediction engine, e.g. via an AP, e.g. AP1. Data/information 868 further includes a received AP recommendation request response message 884 including MLAP PE prediction information 885. The MLAP prediction engine prediction information 885 includes an AP identification and/or address information 886, e.g., AP2 ID and/or address such as a MAC address for AP2, which is ID information of the selected/recommended AP to be the target AP in the handoff, information 887 indicating the location of the selected target AP, information 888 indicating the predicated location of the handoff, and information 889 indicating the predicated time to the handoff. Data/information 868 further includes handoff signaling 890, e.g., generated and/or received handoff related signaling for initiating and performing a handoff (handover) from source AP1 to recommended target AP2, e.g., at a location which is close to the predicted handover location at a time which is close to the predicted handover time.

Figure 9:
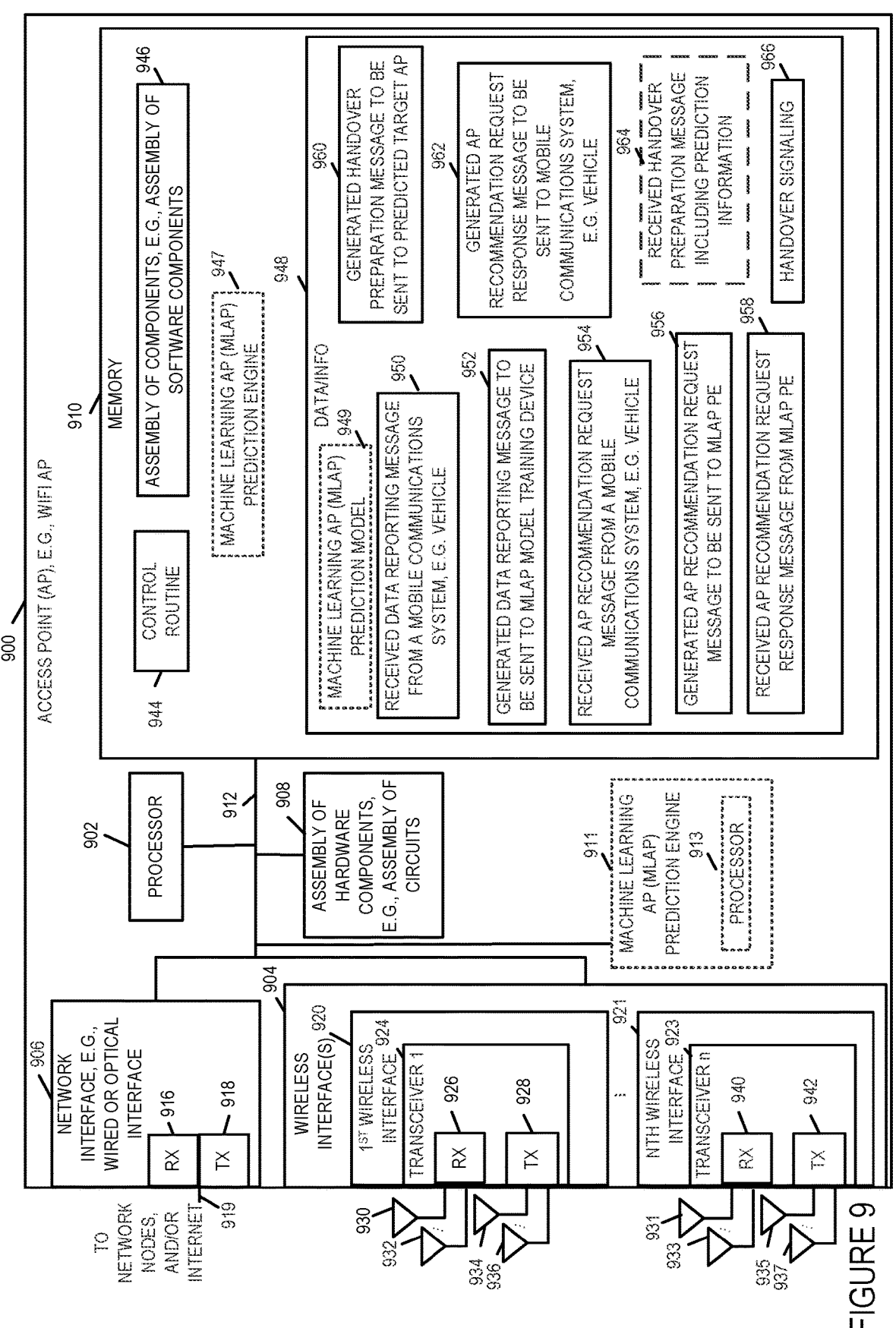

FIG. 9 is drawing of an exemplary access point (AP) 900, e.g., a WiFi AP, in accordance with an exemplary embodiment. Exemplary AP 900 is, e.g., AP 1 150, AP2 152 or AP 3 of FIG. 2 and FIG. 4, an AP implementing steps of the method of flowchart 300 of FIG. 3 or flowchart 700 of FIG. 7 or an AP implementing steps of the method described or shown with respect to the signaling diagram in FIG. 4. AP 900 includes a processor 902, e.g., a CPU, wireless interfaces 904, a network interface 906, e.g., a wired or optical interface, an assembly of hardware components 908, e.g., an assembly of circuits, and memory 910 coupled together via a bus 912 over which the various elements may interchange data and information. In some embodiments, access point 900 further includes a machine learning access point (MLAP) prediction engine 911, e.g., a hardware implementation of a MLAP including an assembly of hardware components, e.g., an assembly of circuits, which is coupled to bus 912. In some such embodiments, prediction engine 911 includes processor 913.

Wireless interfaces 904 includes a plurality of wireless interfaces (wireless interface 1 920, e.g., a first WiFi interface, . . . , wireless interface N 921, e.g., an Nth WiFi interface). Wireless interface 1 1920 includes transceiver 1 924 which includes wireless receiver 926 and wireless transmitter 928. Wireless receiver 926 is coupled to a plurality of receive antennas or receive antenna elements (930, . . . , 932) via which the wireless receiver 926 receives wireless signals, e.g., from mobile communications systems, e.g., vehicles, each vehicle including a WiFi UE, said mobile communications systems being served by the AP 900. Wireless transmitter 928 is coupled to a plurality of transmit antennas or transmit antenna elements (934, . . . , 936) via which the wireless transmitter 928 transmits wireless signals, e.g., to wireless communications systems, e.g., vehicles, being served by the AP 1200. Wireless interface N 1921 includes transceiver n 923 which includes wireless receiver 940 and wireless transmitter 942. Wireless receiver 940 is coupled to a plurality of receive antennas or receive antenna elements (931, . . . , 933) via which the wireless receiver 940 receives wireless signals, e.g., from mobile communications systems, e.g., vehicles, being served by the AP 900. Wireless transmitter 942 is coupled to a plurality of transmit antennas or transmit antenna elements (935, . . . , 937) via which the wireless transmitter 942 transmits wireless signals, e.g., to wireless communications systems, e.g., vehicles, being served by the AP 900.

Memory 910 includes control routine 944, assembly of components 946, e.g., an assembly of software components, and data/information 947. In some embodiments, the memory 946 further includes a machine learning AP (MLAP) prediction engine (PE) 947. Control routine 944 includes machine executable instructions, which when executed by processor 902 control the AP 900 to perform basic operations including read to memory, write to memory, operate an interface, etc. Assembly of software components 944 includes machine executable instructions, which when executed by processor 902 controls the AP 900 to perform steps of an exemplary method in accordance with the present invention, e.g., steps of the method of flowchart 300 of FIG. 3, steps of the method of flowchart 700 of FIG. 7, and/or steps of a method described and/or shown with respect to the signaling diagram of FIG. 4, which are performed by an AP.

Data/information 948 includes a received data reporting message 950 from a mobile communications system e.g., a vehicle, a generated data reporting message to be sent to a MLAP training device 952, a received AP recommendation request message 954 from a mobile communications system, e.g., vehicle, a generated AP recommendation request message 956 to be sent to a MLAP PE, a received AP recommendation request response message 958 from a MLAP PE, a generated handover preparation message 960 to be sent to a predicated target AP, a generated AP recommendation request response message 962 to be sent to a mobile communications system, e.g., vehicle, a received handover preparation message including prediction information 964, and handover signaling 966. In some embodiments, e.g., an embodiment in which AP 900 includes MLAP prediction engine 947, data/information 948 includes a MLAP prediction model 949.

Received data reporting message 950 is, e.g., in accordance with the format of exemplary message 500 of FIG. 5. In some embodiments, generated data reporting message 952 is a forwarded copy of received data reporting message 952. In some embodiments, the generated data reporting message 952 is a message which includes an aggregation of multiple received data reporting messages from one or more mobile communications systems, e.g., vehicles, and optionally includes additional information know to the AP, e.g., AP loading information.

Figure 12:
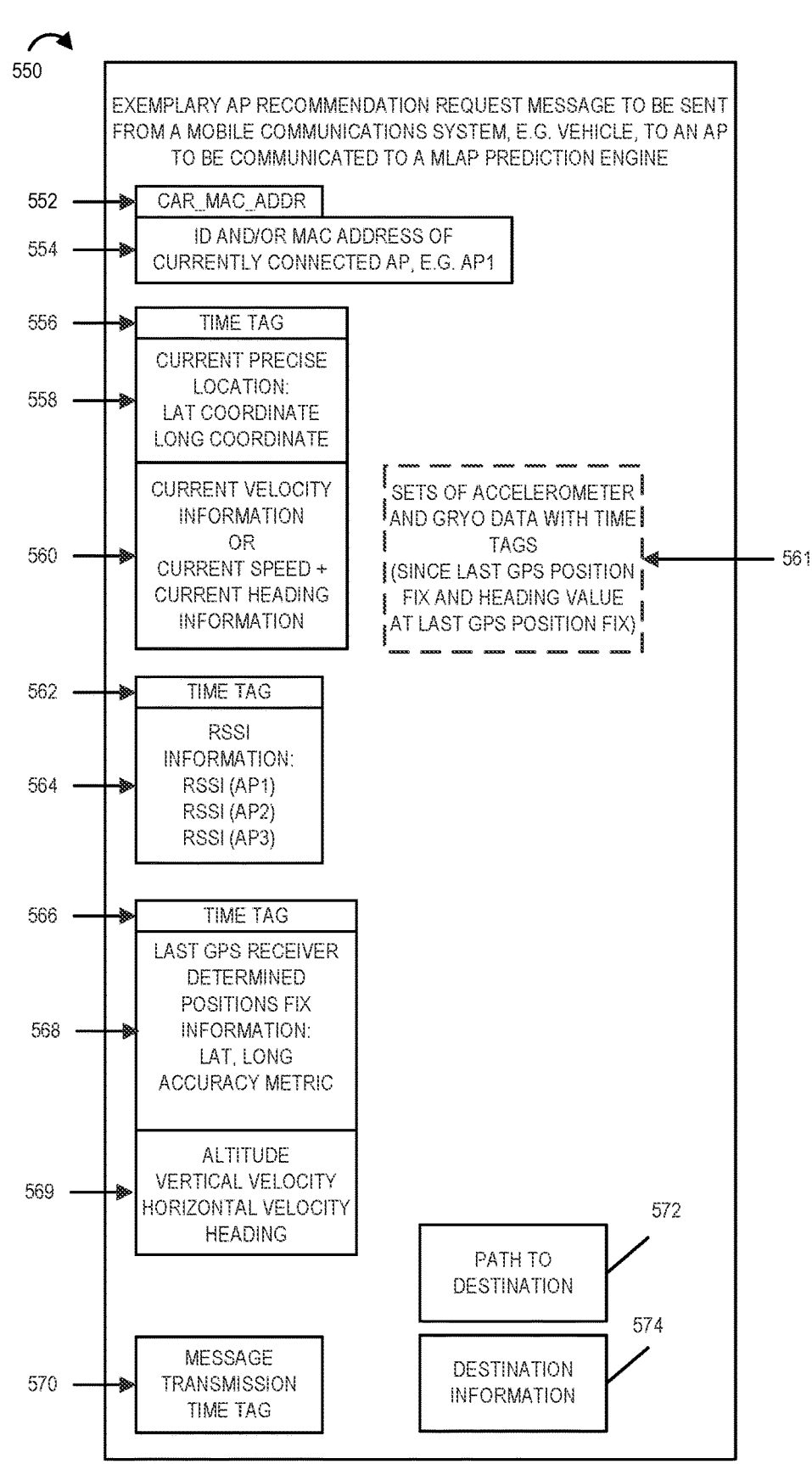

In some embodiments, received AP recommendation request message 954 is, e.g., in accordance with the format of message 550 of FIG. 12 which is exemplary of such a message. In some embodiments, the generated AP recommendation request message 956 is a forwarded copy of received message 954.

In some embodiments, the received AP recommendation request response message 958 is, e.g., in accordance with the format of message 600 of FIG. 6. In some embodiments, the generated AP recommendation request response message 962 is a forwarded copy of received message 958. In some embodiments, the generated handover preparation message 960 includes prediction information included in the received AP recommendation request response message 958. In some embodiments, the message 550 includes destination information 574 indicating a destination indicated by a user of the vehicle 102 and a path to the destination 572 which was determined by the navigation system 809.

Figure 10:
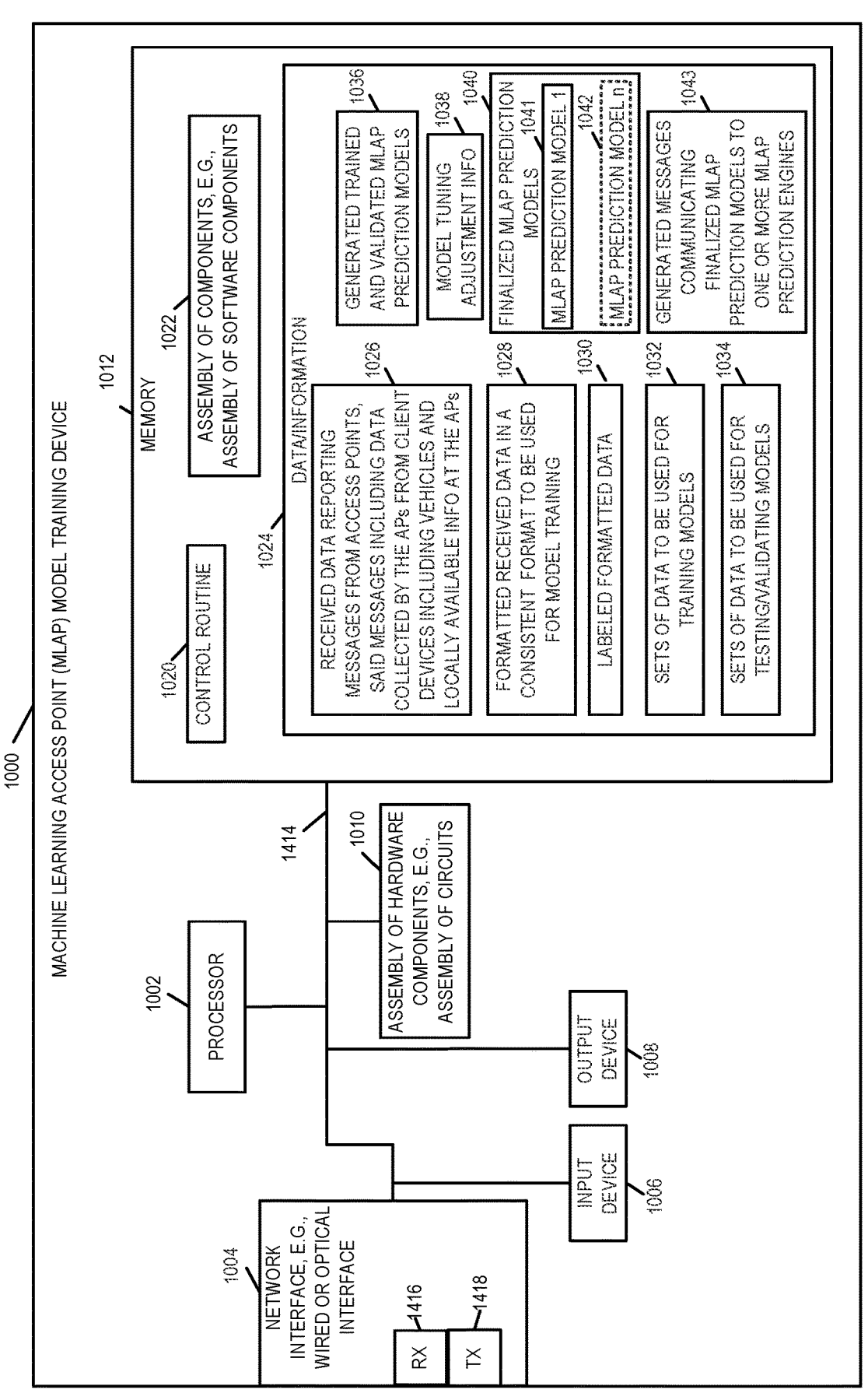

FIG. 10 is a drawing of an exemplary machine learning access point (MLAP) model training device 1000 in accordance with an exemplary embodiment. MLAP model training device 1000 is, e.g., MLAP model training device 404 of network node 405 of cloud/network core 402 of system 400 of FIG. 4 and/or a MLAP model training device implementing steps of the method of flowchart 300 of FIG. 3 and/or steps of the method of flowchart 700 of FIG. 7, which are performed by a MLAP model training device. MLAP training device 1000 includes a processor 1002, e.g., a CPU, a network interface 1004, e.g., a wired or optical interface, an input device 1006, e.g., a keyboard or mouse, an output device 1010, e.g., a display, an assembly of hardware components 1010, e.g., an assembly of circuits, and memory 1012 coupled together via a bus 1014 over which the various elements may interchange data and information.

Network interface 1004 includes a receiver 1016 and a transmitter 1018. Memory 1012 includes a control routine 1020, an assembly of components 1022, e.g., an assembly of software components, and data/information 1024. Control routine 1020 includes machine executable instructions, which when executed by processor 1002 controls the MLAP model training device 1000 to perform basic operations including read to memory, write to memory, operate an interface, etc. Assembly of software components 1022 includes machine executable instructions, which when executed by processor 1002 control the MLAP model training device 1000 to perform steps of an exemplary method in accordance with the present invention, e.g., steps of the method of flowchart 300 of FIG. 3 which are performed by a MLAP training device and/or steps of the method of flowchart 700 of FIG. 7 which are performed by a MLAP training device, and/or steps of the method described and/or illustrated with the signaling diagram of FIG. 4, which are performed by MLAP model training device 404.

Data/information 1024 includes received data reporting messages 1026 from access points, said messages including data (e.g., vehicle ID information, vehicle location, speed, direction, acceleration, and RSSIs of APs detected the vehicle) collected by the APs from client devices including vehicles and locally available information (e.g., vehicle arrive time at AP, vehicle departure time at AP, amount of data communicated by vehicles, latency information, and loading information) at the APs, formatted received data 1028, which is processed version of data 1026, said formatted data being in a consistent form to be used for model training, labelled formatted data 1030, e.g., with good/bad labels being associated with data corresponding to individual connections with an AP with regard to reported RSSIs, data rates achieved and/or traffic latency, sets of data 1032 to be used for training models, sets of data 1034 to be used for testing/validating models, generated trained and validated MLAP prediction model(s) 1036, model tuning adjustment information 1038, finalized MLAP prediction model(s) 1040 (MLAP prediction model 1 1041, . . . , MLAP prediction model n 1042), and generated messages 1043 communicating the finalized MLAP prediction models to one or more MLAP prediction engines. Exemplary message 500 of FIG. 5 is one example of a data reporting message 1026 corresponding to a single mobile communications system, e.g., vehicle. It should be appreciated that some data reporting messages 1026 include data aggregated from multiple APs and/or include additional information locally available to the AP, e.g., loading information, traffic type and/or amount information, arrival time of vehicle at AP, departure time of vehicle at AP, etc.

Figure 11:
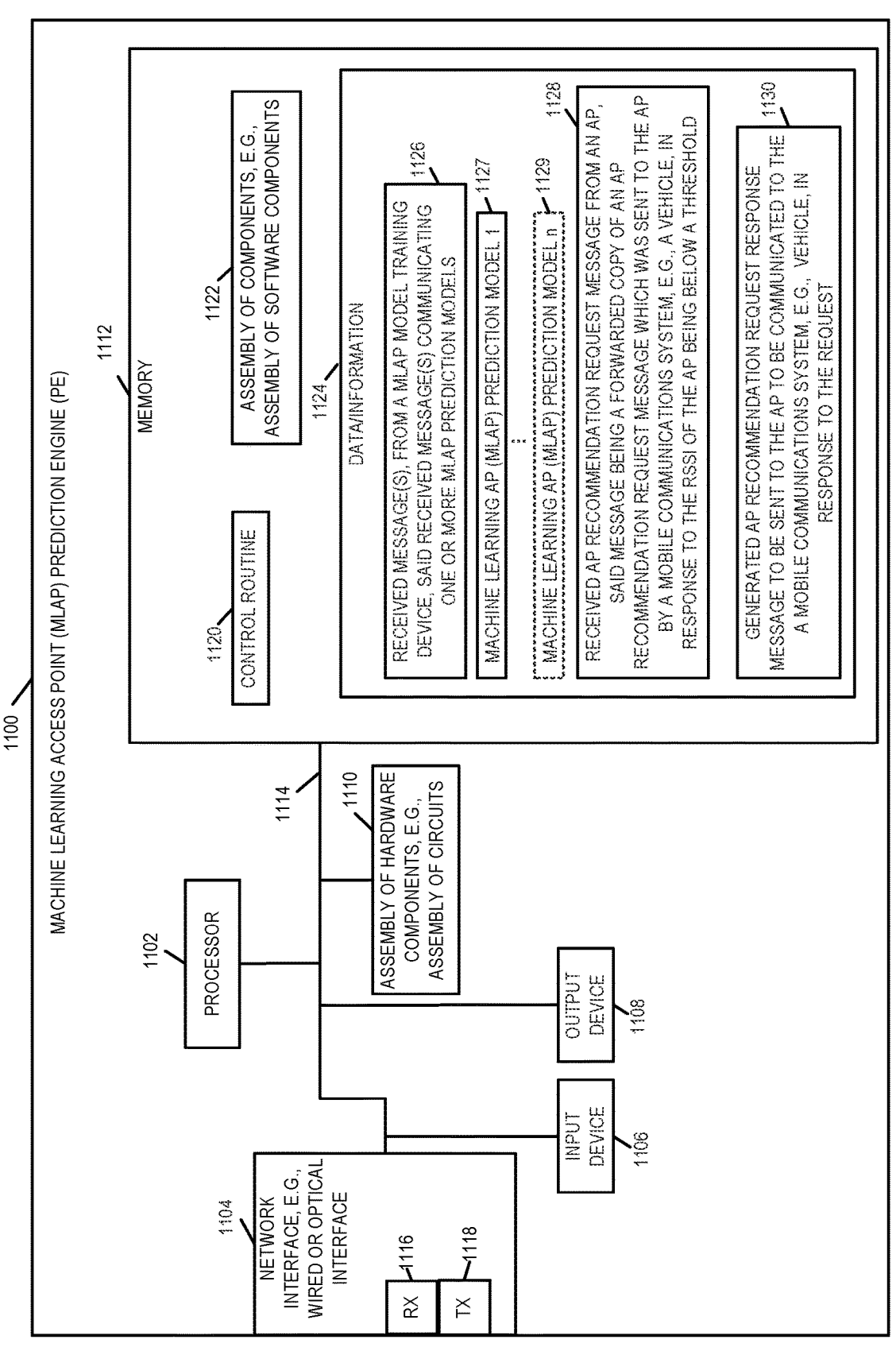

FIG. 11 is a drawing of an exemplary MLAP prediction engine (PE) 1100 in accordance with an exemplary embodiment. MLAP prediction engine 1100 is, e.g., MLAP prediction engine 406 of network node 405 of cloud/network core 402 of system 400 of FIG. 4, MLAP prediction engine, MLAP prediction engine 410 of AP1 150 of system 400 of FIG. 4, MLAP prediction engine 411 of AP2 152 of system 400 of FIG. 4, MLAP prediction engine 411 of AP3 154 of system 400 of FIG. 4, MLAP prediction engine 911 of AP 900 of FIG. 9, MLAP prediction engine 947 of AP 900 of FIG. 9 and/or a MLAP prediction engine implementing steps of the method of flowchart 300 of FIG. 3 and/or steps of the method of flowchart 700 of FIG. 7, which are performed by a MLAP prediction engine. MLAP prediction engine 1100 includes a processor 1102, e.g., a CPU, a network interface 1104, e.g., a wired or optical interface, an input device 1106, e.g., a keyboard or mouse, an output device 1110, e.g., a display, an assembly of hardware components 1110, e.g., an assembly of circuits, and memory 1112 coupled together via a bus 1114 over which the various elements may interchange data and information.

Network interface 1104 includes a receiver 1116 and a transmitter 1118. Memory 1112 includes a control routine 1120, an assembly of components 1122, e.g., an assembly of software components, and data/information 1124. Control routine 1120 includes machine executable instructions, which when executed by processor 1102 controls the MLAP prediction engine 1100 to perform basic operations including read to memory, write to memory, operate an interface, etc. Assembly of software components 1122 includes machine executable instructions, which when executed by processor 1102 control the MLAP prediction engine 1100 to perform steps of an exemplary method in accordance with the present invention, e.g., steps of the method of flowchart 300 of FIG. 3 which are performed by a MLAP prediction engine and/or steps of the method of flowchart 700 of FIG. 7 which are performed by a MLAP prediction engine, and/or steps of the method described and/or illustrated with the signaling diagram of FIG. 4, which are performed by a MLAP prediction engine(s) 406, 408, 410, and/or 411.

Data/information 1124 includes received messages 1126 from a MLAP model training device, said received messages communicating one or more MLAP prediction models to be used by the MLAP PE 1100, MLAP prediction models (MLAP prediction model 1 1127, . . . , MLAP prediction model n 1129), a received AP recommendation request message 1128, said message 1128 being a forwarded copy of an AP recommendation request message which was sent to the AP by a mobile communications system, e.g., a vehicle, in response to the RSSI of the AP being measured to be below a AP recommendation inquiry threshold, and a generated AP recommendation response message 1130 to be sent to the AP to be communicated to the mobile communications device, e.g. the vehicle, in response to the AP recommendation request.

In some embodiments, different MLAP prediction models correspond to different geographic regions and/or to different APs.

The AP recommendation request message 1128 includes, e.g., mobile communications system, e.g., vehicle: ID information, MAC address information, location information (e.g., current precise latitude/longitude), current speed information, and heading information or current velocity information, and optionally other information (e.g., GPS receiver output information (last GPS latitude/longitude position fix, and in some embodiments, GPS receiver navigation module determined vertical velocity, horizontal velocity and heading), IMU information such as accelerometer/gyroscope information, etc.) used to further characterize the mobile communications system, e.g., vehicle, measurements of RSSI of APs detected by the mobile communications system, e.g., vehicle, source AP ID information, source AP MAC address information, path to destination information, and destination information. In some embodiments, the AP recommendation request message 1128 is in accordance with the format of exemplary message 550 of FIG. 12.

The AP recommendation request response message 1130 includes information indicating a predicted (selected and recommended) target AP for the handoff, information indicating a predicted (recommended) time for the handoff, and a predicated (recommended) location for the handoff. In some embodiments, the AP recommendation request response message is in accordance with the format of exemplary message 600 of FIG. 6.

FIG. 12 is a drawing of an exemplary AP recommendation request message 550 to be sent from a mobile communications system, e.g., a vehicle, (e.g., vehicle 102) to an AP (e.g., AP1 150) to be communicated to a MLAP prediction engine (e.g., MLAP prediction engine 406), in accordance with an exemplary embodiment.

Exemplary AP recommendation request message 550 includes: mobile communications system, e.g., vehicle, ID information, which is CAR_MAC_ADDR 552, identification (ID) and/or address information, e.g., a MAC address, of the AP, e.g., AP1, to which the mobile communications system, e.g., vehicle, is currently connected 554. The mobile communications system will be subsequently referred to as a vehicle with regard to the description of message 550 for brevity of explanation. Exemplary AP recommendation request message 550 further includes: a time tag (date and time of day (TOD)) 556, corresponding to a precise location determination of the vehicle, said precise location including a latitude coordinate and a longitude coordinate, current vehicle velocity information or current vehicle speed+current vehicle heading information 560. In some embodiments, information 558, 560 was determined by the vehicle, e.g., using a prior GPS position fix and supplemental IMU data (accelerometer and gyroscope data).

In some embodiments, in place of information 560 or in addition to information 560, optional information set 561 is included in message 550. Information set 561 includes one or more sets of accelerometer and gyroscope output information with time tags, e.g., IMU output data collected since the last GPS position fix, and a heading value at the time of the last GPS position fix, and the MLAP prediction engine determines a current precise location and current velocity information for the vehicle, e.g., an updated version of information 558, 560, based on the last GPS position fix and the supplemental IMU information which was received.

Exemplary AP recommendation request message 550 further includes: time tag 562 and corresponding RSSI measurement information 564 for detected APs, e.g., a vehicle measured RSSI for AP1 (the currently serving AP), an RSSI for AP2 a potential target AP, and an RSSI for AP3 another potential target AP. In this message, it is expected that the RSSI value for AP1 (the current serving AP for the vehicle) will be reported as being below the AP recommendation inquiry threshold.

Exemplary AP recommendation request message 550 further includes: a time tag 566 and a corresponding last GPS receiver determined position fix 568 including a latitude coordinate, a longitude coordinate, and an accuracy metric value, e.g., a value indicating a circular error probability (CEP). In some embodiments, the GPS receiver includes a navigation module which determines altitude, vertical velocity, horizontal velocity and heading information 569, which is also included in message 550.

Exemplary AP recommendation request message 550 further includes a message transmission time tag 570.

In some embodiments, in which the vehicle includes a navigation system, e.g., navigation system 809 including route determination processor 811, the AP recommendation request message 550 further includes path to destination information 572, e.g., a detailed list of a route including information identifying specify roads (streets, highways, etc.,) intended to be traveled, specific points, e.g., waypoints, along the route where turns and/or road changes at to occur, and destination information 574, e.g., a location, e.g., GPS coordinates, of the intended destination.

In some embodiments the MPL training device includes a processor 415 used to control the MLAP training device 404 to generate one or more MLAP prediction models based on data provided to the MLAP training device and perform other operation such as sending or receiving data/messages in accordance with the invention. In some embodiments the MLAP prediction engine 405, 408, 410 or 411 includes a processor 417 which controls the MLAP prediction engine to operate in accordance with the invention including generating predictions, receiving information and/or messages and sending responses including one or more predictions.

Numbered List of Exemplary Method Embodiments

Method Embodiment 1. A communications method, the method comprising: storing (714), in a network node (e.g., network node 405 including MLAP prediction engine (PE) 406 or AP 150, 152 and/or 154 including MLAP PEs 408, 410, 411, 911 or 947), a machine learning access point (MLAP) prediction model (711), used to predict an access point for a mobile communications system (e.g., vehicle 102 or vehicle 103) to handoff to taking into consideration the location and direction of travel of the mobile communications system (102 or 103); receiving (757), at a machine learning access point prediction engine (MLAP PE) (406 or 408), a first message (e.g., AP recommendation request message 550 or 4551 or 4541) from a first mobile communications system (e.g., vehicle 102) communicated via a first access point (AP) (AP1 150) to which the first mobile communications system (102) is connected, indicating the speed and direction of the first mobile communications system (102); selecting (758) at the MLAP PE, (e.g., at MLAP prediction engine 406 or 408), using the stored MLAP prediction model (711), a second access point (AP) (AP2 512) for the first mobile communications system (102) to connect to as part of a handoff from the first access point (150) to which the first mobile communications system (102) is connected; and communicating (760) information from the MLAP PE to the first access point (150) or to a processor (902) in the first AP indicating the second AP (152) selected for the first mobile communications system (102) to connect to as part of the handoff.

Method Embodiment 2. The method of Method Embodiment 1, wherein the first mobile communications system (102) is a first vehicle (102).

Method Embodiment 3. The method of Method Embodiment 1, wherein the first message (550) from the first mobile communications system includes an identifier (552) (e.g., car_MAC_addr_04), identifying the first mobile communications system (102), location information (558) indicating the location of the first mobile communications system (102), direction information (560 or 569), and RSSI information (564) corresponding to one or more APs which were detected by the first mobile communications system (102).

Method Embodiment 4. The method of Method Embodiment 3, wherein the first message (550) is an AP recommendation request message; and wherein communicating (760) information to the first access point (150) or a processor (902) in the first AP (150) indicating the second AP (152) selected for the first mobile communications system (102) to connect to as part of the handoff includes: operating the MLAP PE (406 or 408) to send (761) a response to the AP recommendation request message (550).

Method Embodiment 5. The method of Method Embodiment 4, wherein the AP recommendation request message (550) further includes information indicating a destination (574) of the first mobile communications system (102).

Method Embodiment 6. The method of Method Embodiment 5, wherein the AP recommendation request message (550) further includes information indicating a path (572) to be taken by the first mobile communications system (102) to the indicated destination.

Method Embodiment 6A. The method of Method Embodiment 6, wherein the response to the AP recommendation request message (550) is an AP recommendation request response message (600) that includes information (618) indicating at least a second AP (AP2 152) to which the first mobile communications system is recommended to handoff to as part of an AP handoff operation.

Method Embodiment 6B. The method of Method Embodiment 6A, wherein the AP recommendation request response message (600) further includes one or more of: an indicator indicating a time (e.g., a time as indicated by a time to connection (616) from the time (602) the response message (600) is sent) at which the handoff to the second AP (152) should be initiated by the first mobile communications system or a location (616) at which the handoff to the second AP (152) should be initiated.

Method Embodiment 6C. The method of Method Embodiment 6B, wherein the AP recommendation request response message (600) includes information (618, 620) corresponding to multiple handoffs (e.g., information corresponding to the first handoff from the first AP (150) to the second AP (152) and information about a recommended handoff from the second AP (152) to a third AP (AP3 154) with in some cases time and/or recommended location at which the handoffs are to be initiated being indicated in the AP recommendation request response message) which are to occur as the mobile communications system (102) travels along a path to the indicated destination.

Method Embodiment 7. The method of Method Embodiment 4, further comprising: operating the first AP (150) to send (767) information in the AP recommendation response message (600) to the first mobile communication system (102) for use in controlling a handoff.

Method Embodiment 8. The method of Method Embodiment 7, further comprising: operating the first AP (150) to communicate (766) handover preparation information (4574) to the second AP (410).

Method Embodiment 9. The method of Method Embodiment 8, wherein the handover preparation information (4574) identifies the first mobile communications system and provides information about services the first mobile communications system (102) is entitled to receive.

Method Embodiment 9A. The method of Method Embodiment 9, where the handover preparation information (4574) indicates an expected time of the handoff of the first mobile communications system (102) to the second AP (152).

Method Embodiment 9B. The method of Method Embodiment 9, further comprising: operating the first mobile communications system (102) to determine (732) when it has reached a location at which the handoff from the first AP 150 to the second AP 152 is to occur; and operating the first mobile communications system (102) to initiate a handoff (734) from the first AP 150 to the second AP 152 in response to determining that it has reached the handoff location at which the handoff from the first AP (150) to the second AP (152) is to occur.

Method Embodiment 10. The method of Method Embodiment 2, further comprising: operating the first mobile communications system (102) to: determine (724) a received signal strength indicator value (e.g., an RSSI) corresponding to the first AP (150) with which it is connected; compare (728) the determined received signal strength to an AP handoff inquiry threshold; and send (746), in response to said comparison determining that the received signal strength is below the AP handoff inquiry threshold, said first message (550), said first message (550) being an AP recommendation request message.

Method Embodiment 10A. The method of Method Embodiment 2, further comprising: operating the first mobile communications system (102) to: determine (Yes output of step 738) that a new destination has been entered into a navigation system (809) of the mobile communications system (102); and send (746), said first message (550) in response to determining that the new destination has been entered into the navigation system, said first message (550) being an AP recommendation request message.

Method Embodiment 11. The method of Method Embodiment 2, further comprising: operating the first mobile communications system (102) to report (703) location, speed, direction and RSSI information to the first AP (150).

Method Embodiment 12. The method of Method Embodiment 11, further comprising: operating the first AP (150) to collect (704) information about devices being served by the first AP (150); and operating the first AP (150) to communicate (705) the collected information to a MLAP model training device (404); and operating the MLAP model training device (404) to generate (710) said MLAP prediction model (711).

Method Embodiment 12A. The method of Method Embodiment 12, wherein the MLAP model training device (404) is located in a cloud compute node (405) which is coupled to the first access point (150) via a network connection (e.g., an Internet connection)

Numbered List of Exemplary System Embodiments

System Embodiment 1. A communications system (400), the system (400) comprising: a network node (405, 150, 152, 154, 1100 or 900) including: a machine learning access point (MLAP) prediction engine (PE) (406, 408, 410, 411, 911 or 947); and a memory (1112 or 910) storing a machine learning access point (MLAP) prediction model (711 or 949 or 1127 or 1129) used to predict an access point for a mobile communications system (e.g., vehicle 102 or vehicle 103) to handoff to taking into consideration the location and direction of travel of the mobile communications system (102 or 103); and a processor (417 or 1102 or 913) in the MLAP PE configured to: receive a first message (e.g., AP recommendation request message 550 or 4551 or 4541) from a first mobile communications system (e.g., vehicle 102) communicated via a first access point (AP) (AP1 150) to which the first mobile communications system (102) is connected, indicating the speed and direction of the first mobile communications system (102); select (758) at the MLAP PE, (e.g., at MLAP prediction engine 406 or 408), using the stored ML access point prediction model (711), a second access point (AP) (AP2 512) for the first mobile communications system (102) to connect to as part of a handoff from the first access point (150) to which the first mobile communications system (102) is connected; and communicate (760) information from the MLAP PE to the first access point (150) or to a processor (902) in the first AP indicating the second AP (152) selected for the first mobile communications system (102) to connect to as part of the handoff.

System Embodiment 2. The communications system of System Embodiment 1, wherein the first mobile communications system (102) is a first vehicle (102).

System Embodiment 3. The communications system of System Embodiment 1, wherein the first message (550) from the first mobile communications system includes an identifier (552) (e.g., car_MAC_addr_04), identifying the first mobile communications system (102), location information (558) indicating the location of the first mobile communications system (102), direction information (560 or 569), and RSSI information (564) corresponding to one or more APs which were detected by the first mobile communications system (102).

System Embodiment 4. The communications system of System Embodiment 3, wherein the first message (550) is an AP recommendation request message; and wherein as part of being configured communicate (760) information from the MLAP PE to the first access point (150) or a processor (902) in the first AP indicating the second AP (152) selected for the first mobile communications system (102) to connect to as part of the handoff the processor of the MLAP PE is configured to: send (761) a response to the AP recommendation request message (550).

System Embodiment 5. The communications system of System Embodiment 4, wherein the AP recommendation request message (550) further includes information indicating a destination (574) of the first mobile communications system (102).

System Embodiment 6. The communications system of System Embodiment 5, wherein the AP recommendation request message (550) further includes information indicating a path (572) to be taken by the first mobile communications system (102) to the indicated destination.

System Embodiment 6A. The communications system of System Embodiment 6, wherein the response to the AP recommendation request message (550) is an AP recommendation request response message (600) that includes information (618) indicating at least a second AP (AP2 152) to which the first mobile communications system is recommended to handoff to as part of an AP handoff operation.

System Embodiment 6B. The communications system of System Embodiment 6A, wherein the AP recommendation request response message (600) further includes one or more of: an indicator indicating a time (e.g., a time as indicated by a time to connection (616) from the time (602) the response message (600) is sent) at which the handoff to the second AP (152) should be initiated by the first mobile communications system or a location (616) at which the handoff to the second AP (152) should be initiated.

System Embodiment 6C. The communications system of System Embodiment 6B, wherein the AP recommendation request response message (600) includes information (618, 620) corresponding to multiple handoffs (e.g., information corresponding to the first handoff from the first AP (150) to the second AP (152) and information about a recommended handoff from the second AP (152) to a third AP (AP3 154) with in some cases time and/or recommended location at which the handoffs are to be initiated being indicated in the AP recommendation request response message) which are to occur as the mobile communications system (102) travels along a path to the indicated destination.

System Embodiment 7. The communications system of System Embodiment 4, further comprising: the first AP (150) including a processor (902) configured to control the first AP (150) to: send (767) information in the AP recommendation response message (600) to the first mobile communication system (102) for use in controlling a handoff.

System Embodiment 8. The communications system of System Embodiment 7, wherein the processor (902) in the first AP is further configured to control the first AP (150) to: communicate (766) handover preparation information (4574) to the second AP (410).

System Embodiment 9. The communications system of System Embodiment 8, wherein the handover preparation information (4574) identifies the first mobile communications system (102) and provides information about services the first mobile communications system (102) is entitled to receive.

System Embodiment 9A. The communications system of System Embodiment 9, where the handover preparation information (4574) indicates an expected time of the handoff of the first mobile communications system (102) to the second AP (152).

System Embodiment 9B. The communications system of System Embodiment 9, further comprising: said first mobile communications system (102), the first mobile communication system (102) including a processor (802) configured to control the first mobile communications system (102) to: determine (732) when it has reached a location at which the handoff from the first AP 150 to the second AP 152 is to occur; and initiate a handoff (734) from the first AP 150 to the second AP 152 in response to determining that it has reached the handoff location at which the handoff from the first AP (150) to the second AP (152) is to occur.

System Embodiment 10. The communications system of System Embodiment 2, further comprising: the first mobile communications system (102), said first mobile communications system including a processor (802) configured to control the first mobile communications system (102) to: determine (724) a received signal strength indicator value (e.g., an RSSI) corresponding to the first AP (150) with which it is connected; compare (728) the determined received signal strength to an AP handoff inquiry threshold; and send (746), in response to said comparison determining that the received signal strength is below the AP handoff inquiry threshold, said first message (550), said first message (550) being an AP recommendation request message.

System Embodiment 10A. The communications system of System Embodiment 2, wherein the processor (802) of the first mobile communications system (102) is further configured to: operate the first mobile communications system (102) to determine (Yes output of step 738) that a new destination has been entered into a navigation system (809) of the mobile communications system (102); and operate the first mobile communications system (102) to send (746), said first message (550) in response to determining that the new destination has been entered into the navigation system, said first message (550) being an AP recommendation request message.

System Embodiment 11. The communications system of System Embodiment 2, further comprising: said first mobile communications system (102) including a processor (802) configured to control the first mobile communications system (102) to: report (703) location, speed, direction and RSSI information to the first AP (150).

System Embodiment 12. The communications system of System Embodiment 11, further comprising: said first AP (150) including a processor (902) configured to control the first AP (150) to: collect (704) information about devices being served by the first AP (150); and communicate (705) the collected information to a MLAP model training device (404).

System Embodiment 12AA. The communications system of System Embodiment 12, further comprising: an MLAP model training device (404 or 1000) including a processor (415 or 1002) configured to control the MLAP training device to: generate (710) said MLAP prediction model (711 or 1041 or 1042).

System Embodiment 12A. The communications system of System Embodiment 12, wherein the MLAP model training device (404) is located in a cloud compute node (405) which is coupled to the first access point (150) via a network connection (e.g., an Internet connection).

The techniques of various embodiments may be implemented using software, hardware and/or a combination of software and hardware. Various embodiments are directed to apparatus, e.g., mobile communications systems such as vehicles with WiFi or other wireless interfaces, access points, base stations, user equipment (UE) devices which may be in the form of a vehicle or other mobile communications system, core network devices including core network model training and/or prediction devices and/or elements. Various embodiments are also directed to methods, e.g., method of controlling and/or operating access points, mobile communications systems such as user equipment (UE) devices, core network devices, and/or other mobile devices such as smartphones, portable computers, navigation systems and/or other moveable systems with wireless capability.

Various embodiments are also directed to a machine, e.g., computer, readable medium, e.g., ROM, RAM, CDs, hard discs, etc., which include machine readable instructions for controlling a machine to implement one or more steps of a method, e.g., any one of the methods described herein. The computer readable medium is, e.g., non-transitory computer readable medium. It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., mobile communications systems, access points, user equipment (UE) devices, SAS devices and/or core network devices including model training and/or prediction devices that are described herein are implemented using one or more components to perform the steps corresponding to one or more methods. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user (UE) devices, base stations, access points, core network devices such as a CNSCC device include a processor configured to control the device to perform steps in accordance with one of the methods described herein. The configuration of the processor may be, and sometimes is, achieved by using one or more components, e.g., software components, to control processor configuration and/or by including hardware in the processor, e.g., hardware components, to perform the recited steps and/or control processor configuration.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in a base station, an AP, a UE, a mobile communications system, and/or a core network, for example, but could be in other devices as well. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
storing, in a network node, a machine learning access point (MLAP) prediction model, used to predict an access point (AP) for a mobile communications system to handoff to taking into consideration the location and direction of travel of the mobile communications system;
receiving, at a machine learning access point prediction engine (MLAP PE), a first message from a first mobile communications system communicated via a first AP to which the first mobile communications system is connected, indicating speed and direction of the first mobile communications system;
selecting at the MLAP PE, using the stored MLAP prediction model, a second AP for the first mobile communications system to connect to as part of a handoff from the first AP to which the first mobile communications system is connected; and
communicating information from the MLAP PE to the first AP or to a processor in the first AP indicating the second AP selected for the first mobile communications system to connect to as part of the handoff.

2. The method of claim 1, wherein the first mobile communications system is a first vehicle.

3. The method of claim 1, wherein the first message from the first mobile communications system includes an identifier, identifying the first mobile communications system, location information indicating the location of the first mobile communications system, direction information, and RSSI information corresponding to one or more APs which were detected by the first mobile communications system.

4. The method of claim 3, wherein the first message is an AP recommendation request message; and
wherein communicating information to the first AP or a processor in the first AP indicating the second AP selected for the first mobile communications system to connect to as part of the handoff includes:
operating the MLAP PE to send a response to the AP recommendation request message.

5. The method of claim 4, wherein the AP recommendation request message further includes information indicating a destination of the first mobile communications system.

6. The method of claim 5, wherein the AP recommendation request message further includes information indicating a path to be taken by the first mobile communications system to the indicated destination.

7. The method of claim 4, further comprising:
operating the first AP to send information in an AP recommendation response message to the first mobile communication system for use in controlling a handoff.

8. The method of claim 7, further comprising:
operating the first AP to communicate handover preparation information to the second AP.

9. The method of claim 8, wherein the handover preparation information identifies the first mobile communications system and provides information about services the first mobile communications system is entitled to receive.

10. The method of claim 2, further comprising:
operating the first mobile communications system to:
determine a received signal strength indicator value corresponding to the first AP with which it is connected;
compare the determined received signal strength to an AP handoff inquiry threshold; and
send, in response to said comparison determining that the received signal strength is below the AP handoff inquiry threshold, said first message, said first message being an AP recommendation request message.

11. The method of claim 2, further comprising:
operating the first mobile communications system to report location, speed, direction and RSSI information to the first AP.

12. The method of claim 11, further comprising:
operating the first AP to collect information about devices being served by the first AP; and operating the first AP to communicate the collected information to a MLAP model training device; and operating the MLAP model training device to generate said MLAP prediction model.

13. A communications system, the sustem comprising:

A communications system, the system a network node including:

a machine learning access point (MLAP) prediction engine (PE); and a memory storing a machine learning access point (MLAP) prediction model used to predict an access point (AP) for a mobile communications system to handoff to taking into consideration the location and direction of travel of the mobile communications system; and a processor in the MLAP PE configured to:

receive a first message from a first mobile communications system communicated via a first AP to which the first mobile communications system is connected, indicating speed and direction of the first mobile communications system;

select at the MLAP PE, using the stored MLAP prediction model, a second AP for the first mobile communications system to connect to as part of a handoff from the first AP to which the first mobile communications system is connected; and communicate information from the MLAP PE to the first AP or to a processor in the first AP indicating the second AP selected for the first mobile communications system to connect to as part of the handoff.

14. The communications system of claim 13, wherein first mobile communications system is a first vehicle.

15. The communications system of claim 14, wherein first message from the first mobile communications system includes an identifier, identifying the first mobile communications system, location information indicating the location of the first mobile communications system, direction information, and RSSI information corresponding to one or more APs which were detected by the first mobile communications system.

16. The communications system of claim 15, wherein the first message is an AP recommendation request message; and wherein as part of being configured to communicate information from the MLAP PE to the first access point or a processor in the first AP indicating the second AP selected for the first mobile communications system to connect to as part of the handoff, the processor of the MLAP PE is configured to:

send a response to the AP recommendation request message.

17. The communications system of claim 16, wherein the AP recommendation request message further includes information indicating a destination of the first communications device.

18. The communications system of claim 17, wherein the AP recommendation request message further includes information indicating a path to be taken by the first mobile communications system to the indicated destination.

19. The communications system of claim 16, further comprising:

the first AP including a processor configured to control the first AP to:

send information in an AP recommendation response message to the first mobile communication system for use in controlling a handoff.

20. The communications system of claim 19, wherein the processor in the first AP is further configured to control the first AP to:

communicate handover preparation information to the second AP.

* * * * *